(12) United States Patent
Cociglio et al.

(10) Patent No.: US 10,986,007 B2
(45) Date of Patent: Apr. 20, 2021

(54) PERFORMANCE MEASUREMENT IN A COMMUNICATION NETWORK

(71) Applicant: TELECOM ITALIA S.p.A., Milan (IT)

(72) Inventors: Mauro Cociglio, Turin (IT); Giuseppe Fioccola, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 0 days.

(21) Appl. No.: 16/630,133

(22) PCT Filed: Jul. 16, 2018

(86) PCT No.: PCT/EP2018/069244
§ 371 (c)(1),
(2) Date: Jan. 10, 2020

(87) PCT Pub. No.: WO2019/016128
PCT Pub. Date: Jan. 24, 2019

(65) Prior Publication Data
US 2020/0169488 A1    May 28, 2020

(30) Foreign Application Priority Data

Jul. 18, 2017 (IT) .................. 102017000081391

(51) Int. Cl.
*H04L 12/26* (2006.01)
*H04L 12/721* (2013.01)
*H04L 12/927* (2013.01)

(52) U.S. Cl.
CPC ...... *H04L 43/0817* (2013.01); *H04L 43/0835* (2013.01); *H04L 43/106* (2013.01); *H04L 45/38* (2013.01); *H04L 47/80* (2013.01)

(58) Field of Classification Search
CPC ............ H04L 43/0852; H04L 43/0817; H04L 43/0835; H04L 43/106; H04L 45/38; H04L 47/80
(Continued)

(56) References Cited

U.S. PATENT DOCUMENTS

2011/0255440 A1    10/2011    Cociglio et al.

FOREIGN PATENT DOCUMENTS

EP    2 456 126 A1    5/2012
EP    2456126 A1 *    5/2012    ......... H04L 43/0835
WO    WO 2010/072251 A1    7/2010

OTHER PUBLICATIONS

Fioccola et al. "Alternate Marking method for passive Performance Monitoring", Mar. 1, 2017, pp. 1-30.*

(Continued)

*Primary Examiner* — Frantz B Jean
(74) *Attorney, Agent, or Firm* — Oblon, McClelland, Maier & Neustadt, L.L.P.

(57) ABSTRACT

A method for performing a performance measurement on a packet flow is based on division of the packet flow to be measured in alternating blocks. A couple of connections are provided, originated by respective originating network points (physical or logical interface or port) and terminated by respective terminating network points (physical or logical interface or port). Division of the packet flow to be measured is implemented by periodically switching transmission of the packets between the two originating network points. At each network point originating or terminating a connection, a measurement point is implemented which provides performance parameters (counter and/or timestamp) relating to the packets to be transmitted by or which have been received from the related connection. The performance measurement (Continued)

on the packet flow is then performed based on the performance parameters provided by the measurement points.

17 Claims, 11 Drawing Sheets

(58) Field of Classification Search
USPC .................................................. 709/203, 224
See application file for complete search history.

(56) References Cited

OTHER PUBLICATIONS

Hen et al. "IP Flow Performance Measurement Framework", Mar. 17, 2016, pp. 1-17.*

Frost S Bryant Cisco Systems "Packet Loss and Delay Measurement for MPLS Network", Sep. 18, 2011, pp. 1-52.*
International Search Report dated Aug. 10, 2018 in PCT/EP2018/069244, 4 pages.
Fioccola, G., et al., "Alternate Marketing method for passive performance monitoring: draft-ietf-ippm-alt-mark-04". Network Working Group, Internet-Draft. Internet Engineering Task force, IEFT; standardworkingdraft, internet society (ISOC) 4, Mar. 1, 2017, XP015118175. pp. 1-30.
Chen, M., et al., "IP Flow Performance Measurement Framework: draft-chen-ippm-coloring-based-ipfpm-framework-06", Network Working Group Internet—Draft. Internet Engineering Task Force, IEFT; Standerdworkingdraft, internet society(ISOC) 4, XP015111810, Mar. 17, 2016, pp. 1-17.
Frost, D., et al., "Packet Loss and Delay Measurement for MPLS Networks", Internet Engineering Task Force (IEFT): Standard, Internet Society (ISOC) 4. XP015081292, Sep. 16, 2011, pp. 1-52.

\* cited by examiner

PERFORMANCE MEASUREMENT IN A COMMUNICATION NETWORK

TECHNICAL FIELD

The present invention relates to the field of communication networks. In particular, the present invention relates to a method for performing a performance measurement in a packet-switched communication network. Further, the present invention relates to nodes and computers for communication network configured to implement such a method, and to computer networks comprising such nodes and computers.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Besides, packets may be discarded by a node since they contain bit errors.

Moreover, each packet is transmitted at a transmission time by the source node and is received at a reception time by the destination node (if it is not lost). The time elapsing between transmission time and reception time is typically called "one-way delay". The one-way delay of a packet mainly depends on the number of possible intermediate nodes crossed by the packet from source to destination, the permanence time of the packet at each node and the propagation time along the links.

Furthermore, packets may have different one-way delays. The difference between the one-way delays of two packets of a same packet flow is termed "interarrival jitter" (or, briefly, "jitter").

When a communication service (in particular, a real-time voice or data service such as call, conference call, video conference, etc.) is provided by means of a packet-switched network, a performance measurement in terms of packet loss, one-way delay and jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators.

WO 2010/072251 (in the name of the same Applicant) discloses a method for measuring packet loss of a packet flow transmitted from a transmitting node to a receiving node. The transmitting node divides the packet flow to be measured in alternating blocks of packets, by using a so called "marking bit" in the packets' header. In particular, the transmitting node periodically switches the value of the marking bit between a first marking value (e.g. "1") and a second marking value (e.g. "0"), thereby providing blocks of packets marked by "1" which alternate in time with blocks of packets marked by "0". Instead of using a marking bit in the packet's header, the alternate marking may be implemented by providing a couple of connections (e.g. a couple of MPLS tunnels) on a span of the path followed by the packet flow to be measured and periodically switching the connection to be used for carrying the packets. Basically, the identifier of the connection carrying each packet (e.g. the MPLS label, in case of MPLS tunnels) is the marking value of that packet.

SUMMARY OF THE INVENTION

The Applicant has perceived the need to improve the method disclosed by WO 2010/072251, especially when the alternate marking of the packet flow to be measured is implemented by a couple of connections as described above.

The Applicant has indeed noticed that both the connections alternately used for carrying the packet flow to be measured are terminated on a same interface. Hence, after the connections are terminated, the packets carried by the two connections are merged and are neither marked, nor reciprocally distinguishable in any other way any more.

Performance parameters (counters, timestamps) for performing measurements based on alternate marking of the packets shall therefore be provided within the connections, namely before the connections are terminated. Within each connection, however, the packets carried by that connection are not distinguishable one another. In particular, in case the packet flow to be measured is a multipoint packet flow (namely, it comprises sub-flows originated by different source nodes and/or addressed to different destination nodes), packets carried by a connection and belonging to different sub-flows can not be distinguished within that connection. Therefore, it is disadvantageously not possible providing performance measurements based on alternate marking for each sub-flow separately. This drawback could be obviated by using a deep packet inspection technique within each connection, which would allow reading the content of the headers (in particular, source node and/or destination node) of the packets carried by that connection. Usually, deep packet inspection techniques are however complex and costly to implement.

Furthermore, since packets which were carried by the two connections are merged and are not reciprocally distinguishable after the connections are terminated by the same interface, consistent performance measurements relating to different spans of the path followed by the packet flow can not be provided. If, indeed, a further couple of connections is implemented on another span of the path followed by the packet flow, the same distribution of the packets between the two new connections as in the previous couples of connections can not be maintained. Hence, performance measurements relating to different spans of the path of the packet flow to be measured, which are consistent and can be correlated e.g. to provide end-to-end measurements, disadvantageously can not be provided.

In view of the above, the Applicant has tackled the problem of providing a method for performing a performance measurement in a communication network, which overcomes the aforesaid drawbacks.

In particular, the Applicant has tackled the problem of providing a method for performing a performance measurement in a communication network, which implements the alternate marking of the packet flow to be measured by using a couple of connections as described above and which, at the same time, allows providing (i) separate measurements for each sub-flow possibly comprised in the packet flow to be measured and (ii) consistent measurements on different spans of the path followed by the packet flow to be measured.

In the following description and in the claims, the expression "performing a performance measurement on a packet flow" will designate an operation of measuring:
- a one-way delay, a two-way delay or a jitter induced on packets of said packet flow by transmission between the two measurement points; and/or
- a packet loss induced on packets of said packet flow by transmission between the two measurement points.

Furthermore, in the present description and in the claims, the term "connection" will designate an atomic point-to-point physical or logical link pre-established (namely, established before starting packet transmission) in a communication network at layer 2 (data link layer), layer 3 (network layer) or layer 4 (transport layer) between an originating network point (namely, a physical or logical interface or port, depending on the protocol of layer 2, 3 or 4 based on which the connection is implemented) and a terminating network point (namely, a physical or logical interface or port, depending on the protocol of layer 2, 3 or 4 based on which the connection is implemented), wherein "atomic" means that, short of packet loss events, all the packets entering the connection at the originating network point are conveyed along the connection's path up to the terminating network point (no possibility to depart from the connection's path). Exemplary connections may be MPLS tunnels, IP tunnels, layer 4 sessions (e.g. TCP sessions, HTTP sessions, etc.) or static routes through the communication network.

According to embodiments of the present invention, the above problem is solved by a method for performing a performance measurement on a packet flow, which is based on division of the packet flow to be measured in alternating blocks. A couple of connections is provided, originated by respective originating network points (physical or logical interface or port) and terminated by respective terminating network points (physical or logical interface or port). Division of the packet flow to be measured is implemented by periodically switching transmission of the packets between the two originating network points. At each network point originating or terminating a connection, a measurement point is implemented which provides performance parameters (counter and/or timestamp) relating to the packets to be transmitted by or which have been received from the related connection. The performance measurement on the packet flow is then performed based on the performance parameters provided by the measurement points.

Therefore, advantageously, after the connections implementing the packet flow division have been terminated (for instance, in case of MPLS tunnels, at the network points terminating the MPLS tunnels, the packets are extracted from the MPLS tunnels by removing their MPLS headers), the termination of the two connections on separate logical or physical network points advantageously allows keeping the packets carried by a connection logically or physically separated from those carried by the other connection. Then, performance parameters relating to packets extracted from each connection are separately provided.

This advantageously allows providing separate measurements for each sub-flow possibly comprised in the packet flow to be measured. Indeed, since the performance parameters relating to the packets carried by each connection are provided before the packets are inserted in the connection and after the packets have been extracted from that connection, packets belonging to different sub-flows may be identified by reading the content (e.g. source address or destination address) of the packet's header, without using complex and costly deep packet inspection techniques.

Moreover, consistent measurements on different spans of the path followed by the packet flow to be measured may be advantageously provided. Indeed, since the packets carried by a connection are kept logically or physically separate from the packets carried by the other connection even after the connections have been terminated, the packets coming from each connection may be inserted in a further connection of a subsequent couple of connections implemented on a subsequent span of the path. This way, the same distribution of the packets as in the previous couple of connections can be maintained in the subsequent couple of connections. Hence, performance measurements relating to different spans of the path of the packet flow to be measured, which are consistent and can be correlated e.g. to provide end-to-end measurements, can be advantageously provided.

According to a first aspect, the present invention provides a method for performing a performance measurement on a packet flow transmitted in a communication network, the method comprising:
a) alternately transmitting packets of the packet flow on a first connection and second connection set up through the communication network;
b) providing a first transmission performance parameter and a second transmission performance parameter relating to the packets as transmitted alternately on the first connection and the second connection, respectively;
c) providing a first reception performance parameter and a second reception performance parameter relating to the packets as received alternately from the first connection and the second connection, respectively; and
d) providing a performance measurement relating to the packet flow based on the first transmission performance parameter and the first reception performance parameter, or based on the second transmission performance parameter and the second reception performance parameter,
wherein:
the first connection and the second connection are originated by a first originating network point and a second originating network point, respectively, and are terminated by a first terminating network point and a second terminating network point, respectively; and
step a) comprises periodically switching transmission of the packets between the first originating network point and the second originating network point, packets transmitted by the first originating network point and the second originating network point being received at the first terminating network point and the second terminating network point, respectively.

According to advantageously embodiments, step a) further comprises:
transmitting packets of the packet flow received from the first connection on a further first connection set up through the communication network; and
transmitting packets of the packet flow received from the second connection on a further second connection set up through the communication network,
wherein the further first connection and the further second connection are originated by the first terminating network point and the second terminating network point, respectively, and are terminated by a further first terminating network point and a further second terminating network point, respectively.

According to such embodiments, preferably:
step c) further comprises providing a further first reception performance parameter and a further second reception performance parameter relating to the packets as received alternately from the further first connection and the further second connection, respectively; and step d) comprises providing a further performance measurement relating to the packet flow based on the first transmission performance parameter or the first reception performance parameter and the further first reception performance parameter, or based on the second transmission performance parameter or the second reception performance parameter and the further second reception performance parameter.

Preferably, step a) comprises transmitting packets of the packet flow by the first originating network point on the first connection during first block periods and transmitting packets of the packet flow by the second originating network point on the second connection during second block periods which alternate in time with the first block periods.

According to some embodiments, the first connection and the second connection are set up on a link between a first node and a second node of the communication network, the first originating network point and the second originating network point being implemented at the first node and the first terminating network point and the second terminating network point being implemented at the second node.

According to other embodiments, the first connection and the second connection are set up within a node of the communication network, the first originating network point, the second originating network point, the first terminating network point and the second terminating network point being implemented at the node.

Preferably, the first originating network point and the second originating network point are physically separated network points, and step a) comprises physically splitting the packet flow between the first originating network point and second originating network point.

Alternatively, the first originating network point and second originating network point are logically separated network points, and step a) comprises logically splitting the packet flow between the first originating network point and second originating network point by adding to each packet of the packet flow a connection header comprising a connection identifier, before transmission.

Preferably, the first connection and the second connection are implemented according to a protocol of data link layer, network layer or transport layer.

According to some embodiments, the packet flow is a multipoint packet flow comprising packets having multiple source addresses and/or multiple destination addresses, and:

step b) comprises providing first transmission performance parameters and second transmission performance parameters relating to the packets as transmitted alternately on the first connection and the second connection, respectively;

step c) comprises providing first reception performance parameters and second reception performance parameters relating to the packets as received alternately from the first connection and the second connection, respectively; and step d) comprises providing a performance measurement relating to packets of the packet flow having a source address of the multiple source addresses and a destination address of the multiple destination addresses based on one of the first transmission performance parameters and one of the first reception performance parameters, or based on one of the second transmission performance parameters and one of the second reception performance parameters.

According to advantageous variants, step a) comprises:
upon reception of each packet of the packet flow, checking whether at least one field in the header of the received packet fulfils a balancing condition;

during first periods, transmitting packets of the packet flow which fulfil the balancing condition by the first originating network point and transmitting packets of the packet flow which do not fulfil the balancing condition by the second originating network point; and during second periods which alternate in time with the first periods, transmitting packets of the packet flow which do not fulfil the balancing condition by the first originating network point and transmitting packets of the packet flow which fulfil the balancing condition by the second originating network point.

According to such advantageous variants:
step b) comprises providing the first transmission performance parameter and the second transmission performance parameter relating only to packets which fulfil the balancing condition as transmitted alternately on the first connection and the second connection, respectively, and providing another first transmission performance parameter and another second transmission performance parameter relating only to packets which do not fulfil the balancing condition as transmitted alternately on the first connection and the second connection, respectively, step c) comprises providing the first reception performance parameter and the second reception performance parameter relating only to the packets which fulfil the balancing condition as received alternately from the first connection and the second connection, respectively, and providing another first reception performance parameter and another second reception performance parameter relating only to the packets which do not fulfil the balancing condition as received alternately from the first connection and the second connection, respectively; and step d) comprises providing the performance measurement relating to the packet flow based on the first transmission performance parameter merged with the another first transmission performance parameter and on the first reception performance parameter merged with the another first reception performance parameter, or based on the second transmission performance parameter merged with the another second transmission performance parameter and on the second reception performance parameter merged with the another second reception performance parameter.

Preferably:
at step b) the first transmission performance parameter and the second transmission performance parameter comprise a first transmission counter counting packets transmitted by the first originating network point and a second transmission counter counting packets transmitted by the second originating network point, respectively;

at step c) the first reception performance parameter and the second reception performance parameter comprise a first reception counter counting packets received by the first terminating network point and a second reception counter counting packets received by the second terminating network point, respectively; and step d) comprises calculating a packet loss affecting the packet flow based on the first transmission counter and the first reception counter, or based on the second transmission counter and the second reception counter.

Preferably:
at step b) the first transmission performance parameter and the second transmission performance parameter comprise a first transmission timestamp relating to at least one packet transmitted by the first originating network point and a second transmission timestamp relating to at least one packet transmitted by the second originating network point, respectively;
at step c) the first reception performance parameter and the second reception performance parameter comprise a first reception timestamp relating to packets received by the first terminating network point and a second reception timestamp relating to at least one packet received by the second terminating network point, respectively;
step d) comprises providing a time measurement based on the first transmission timestamp and the first reception timestamp, or based on the second transmission timestamp and the second reception timestamp.

According to a second aspect, the present invention provides a communication network configured to:
a) alternately transmit packets of a packet flow on a first connection and second connection set up through the communication network;
b) provide a first transmission performance parameter and a second transmission performance parameter relating to the packets as transmitted alternately on the first connection and the second connection, respectively;
c) provide a first reception performance parameter and a second reception performance parameter relating to the packets as received alternately from the first connection and the second connection, respectively; and
d) provide a performance measurement relating to the packet flow based on the first transmission performance parameter and the first reception performance parameter, or based on the second transmission performance parameter and the second reception performance parameter,
wherein:
the first connection and the second connection are originated by a first originating network point and a second originating network point, respectively, and are terminated by a first terminating network point and a second terminating network point, respectively; and
the communication network is configured to periodically switch transmission of the packets between the first originating network point and the second originating network point, packets transmitted by the first originating network point and the second originating network point being received at the first terminating network point and the second terminating network point, respectively.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
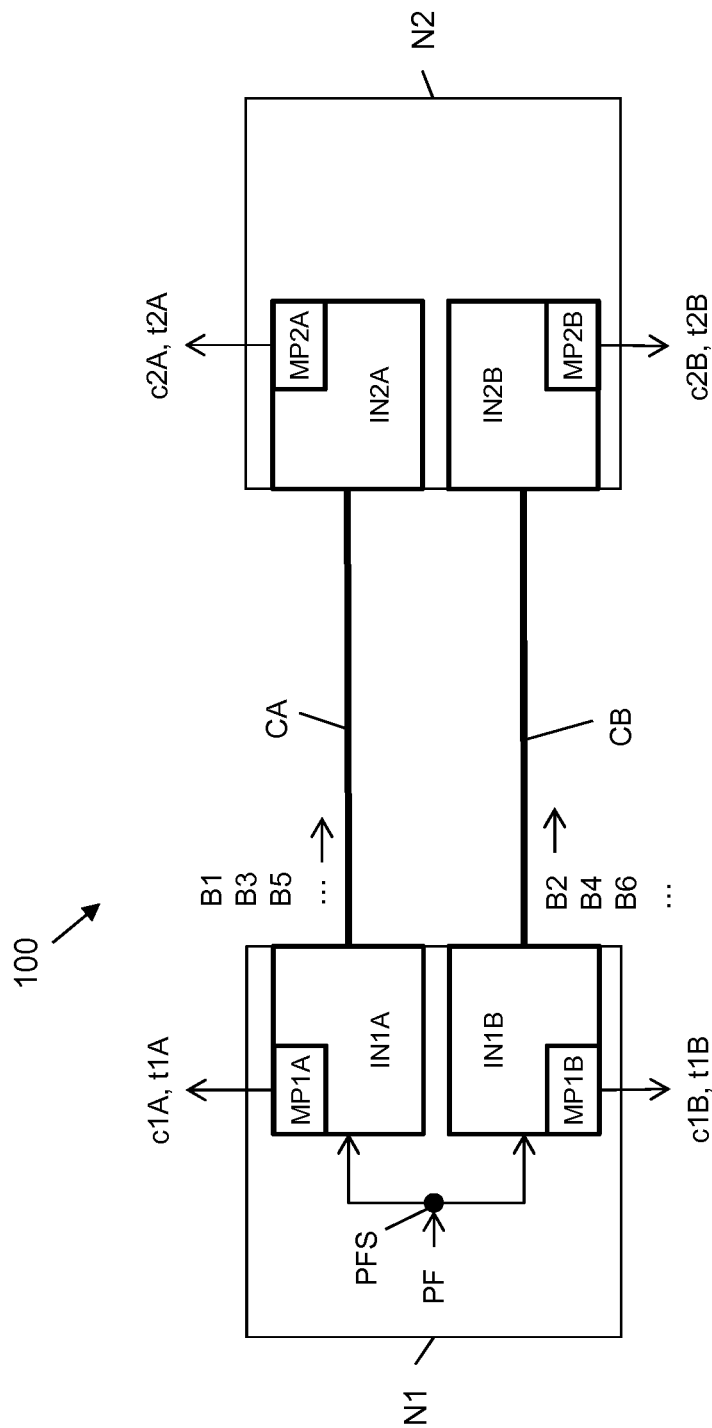
FIG. 1 schematically shows a portion of a communication network in which the method according to a first embodiment of the present invention is implemented.

FIG. 1 schematically shows a portion of a communication network 100 in which the method according to a first embodiment of the present invention is implemented. The communication network 100 preferably is a packet-switched communication network, e.g. an IP network.

The communication network 100 comprises a plurality of nodes reciprocally interconnected by physical links according to any known topology, including nodes N1 and N2 shown in FIG. 1.

The nodes N1 and N2 are connected by a physical link, e.g. an optical link. The physical link may be direct (namely, the nodes N1 and N2 may be adjacent) or may comprise a concatenation of several physical links (namely, intermediate nodes not shown in FIG. 1 are located between N1 and N2).

A couple of connections CA, CB is implemented over the physical link between the nodes N1 and N2. The connections CA, CB may be implemented according to any protocol of layer 2, layer 3 or layer 4.

The connections CA, CB may be e.g. MPLS tunnels, IP over IP tunnels, TCP sessions, HTTP sessions or static routes across the communication network 100. Each connection CA, CB may be optionally identified by a respective identifier ID1A, ID1B. For instance, in case the connections CA, CB are MPLS tunnels, their identifiers preferably are their MPLS labels.

At the node N1, each connection CA, CB is originated by a respective interface IN1A, IN1B comprised in node N1. The node N1 also preferably comprises a packet flow splitter PFS having one input and two outputs connected to the interfaces IN1A, IN1B. Besides, at the node N2 each connection CA, CB is terminated by a respective interface IN2A, IN2B comprised in node N2. The interfaces IN1A, IN1B, IN2A, IN2B may be physical interfaces, or logical interfaces. Further, even though in the following detailed description reference to interfaces will be made, this is not limiting. Depending on the protocol of layer 2, 3 or 4 based on which the connections CA, CB are implemented, the interfaces IN1A, IN1B, IN2A, IN2B may be replaced by other types of network points (e.g. physical or logical ports) suitable for originating and terminating the connections CA, CB.

At each interface IN1A, IN1B of the node N1, a measurement point MP1A, MP1B is preferably implemented. Each measurement point MP1A, MP1B is preferably configured to provide performance parameters relating to the packets to be transmitted by the respective interface IN1A, IN1B to the node N2, as it will be described in detail herein after. Similarly, at each interface IN2A, IN2B of the node N2, a measurement point MP2A, MP2B is preferably implemented. Each measurement point MP2A, MP2B is preferably configured to provide performance parameters relating to the packets received by the respective interface IN2A, IN2B from the node N1, as it will be described in detail herein after.

The communication network 100 supports transmission of a packet flow PF. The packet flow PF comprises a flow of packets, e.g. IP packets. Each packet comprises a header and a payload. The payload comprises user data. The header comprises information for routing the packet. The header format depends on the protocol according to which the packets are formatted (e.g. IPv4 or IPv6). In any case, the header comprises the source address of the packet and the destination address of the packet.

The packet flow PF may be a point-to-point packet flow, namely a packet flow entirely built up of packets having a same source address and a same destination address, whose path across the communication network 100 comprises at least the physical link between the nodes N1 and N2.

Alternatively, the packet flow PF may be a multipoint packet flow, namely a packet flow comprising packets having different sources addresses and/or different destination addresses and whose paths share at least the physical link between the nodes N1 and N2. For instance, the packet flow PF may comprise packets having a same source address but different destination addresses, or packets having a same destination address but different source addresses.

Assuming that a performance measurement of the packet flow PF is to be made between the nodes N1 and N2, at the node N1 the packet flow PF is preferably divided into alternating blocks of packets B1, B2, B3, B3, B5, B6, etc. before its transmission over the physical link towards N2.

In order to implement such division of the packet flow PF, the node N1 switches the network point IN1A, IN1B which shall transmit the packets of the packet flow PF periodically. In particular, the transmission is periodically switched between IN1A and IN1B with a switching period Tb. The switching period Tb may be set by the network operator, according to the desired time measurement rate (as it will be apparent from the detail description herein after, the switching period Tb is also the measurement period). For instance, the switching period Tb may be equal to 5 minutes.

Figure 2:
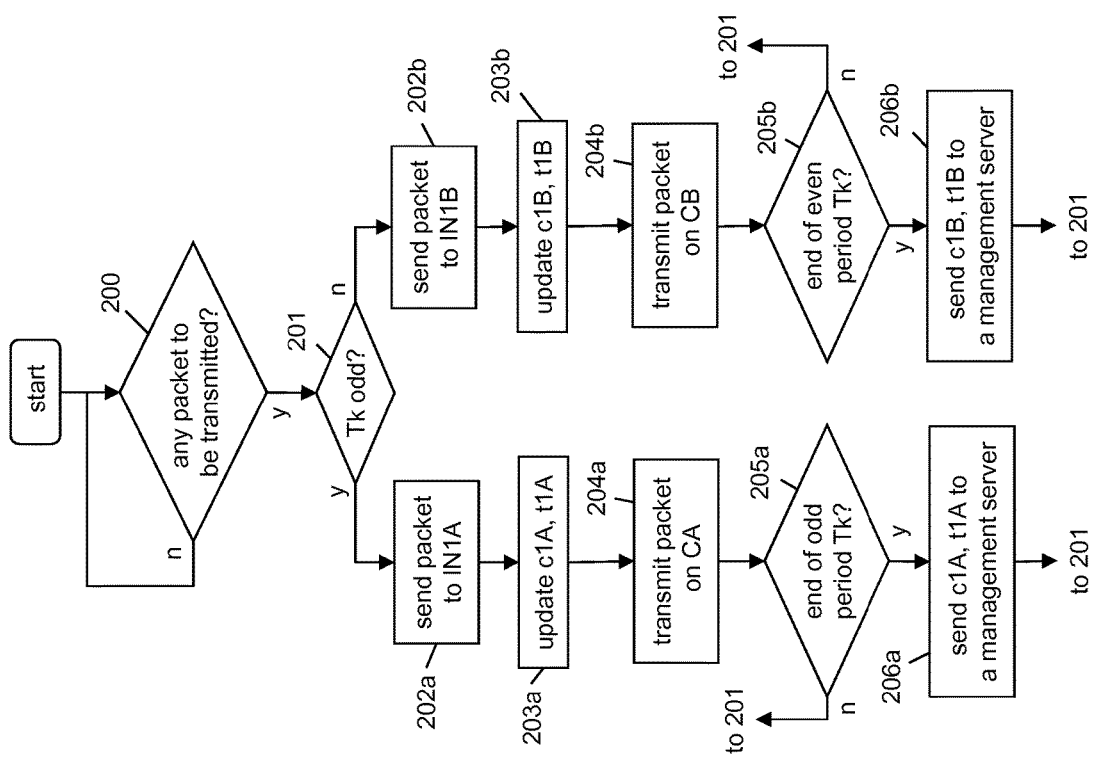

In particular, with reference to the flow chart of FIG. 2, the node N1 preferably waits for possible packets of the packet flow PF to be measured (step 200). The node N1 may identify the packets of the packet flow PF based on their source address and/or their destination address.

Upon identification of a packet of the packet flow PF, the packet flow splitter PFS at the node N1 preferably checks whether the current switching period Tk (k=1, 2, 3, 4, 5, 6, etc.) is an even period or an odd period (step 201). This allows the packet flow splitter PFS determining the connection CA (e.g. during odd periods) or CB (e.g. during even periods) which shall be used to transmit the identified packet and, therefore, the interface INA or INB to which the packet shall be forwarded.

In particular, if Tk is an odd period, the packet flow splitter PFS sends the received packet to the interface IN1A originating the connection CA (step 202a). Then, the measurement point MP1A preferably updates at least one performance parameter relating to packets to be transmitted by the connection CA (step 203a). The performance parameters preferably are a counter c1A counting the number of packets to be transmitted by the interface IN1A on the connection CA and a cumulative timestamp t1A which is the summation of transmission timestamps of packets to be transmitted by the interface IN1A on the connection CA. At step 203a, the measurement point MP1A preferably increases the counter c1A by one and increases the value of the cumulative timestamp t1A by the transmission time of the identified packet.

The packet is then transmitted by the interface IN1A on the connection CA towards the node N2 (step 204a).

Steps 203a, 204a are preferably iterated each time a packet of the packet flow PF is identified, until the end of the period Tk (step 205a). Hence, during odd periods Tk, the interface IN1A transmits blocks B1, B3, B5, etc. of packets of the packet flow PF on the connection CA, as schematically depicted in FIG. 1.

Upon expiration of the period Tk, the measurement point MP1A preferably sends the value of the performance parameters (preferably, the counter c1A and the cumulative timestamp t1A) to a management server (not shown in the drawings) responsible of providing the performance measurements (step 206a).

If, at step 202, the packet flow splitter PFS determines that Tk is an even period, the packet flow splitter PFS sends the received packet to the interface IN1B originating the connection CB (step 202b). Then, the measurement point MP1B preferably updates at least one performance parameter relating to packets to be transmitted by the connection CB (step 203b). The performance parameters preferably are a counter c1B counting the number of packets to be transmitted by the interface IN1B on the connection CB and a cumulative timestamp t1B which is the summation of transmission timestamps of packets to be transmitted by the interface IN1B on the connection CB. At step 203b, the measurement point MP1B preferably increases the counter c1B by one and increases the value of the cumulative timestamp t1B by the transmission time of the identified packet.

The packet is then transmitted by the interface IN1B on the connection CB towards the node N2 (step 204b).

Steps 203b, 204b are preferably iterated each time a packet of the packet flow PF is identified, until the end of the period Tk (step 205b). Hence, during even periods Tk, the interface IN1B transmits even blocks B2, B4, B6, etc. of packets of the packet flow PF on the connection CB, as schematically depicted in FIG. 1.

Upon expiration of the period Tk, the measurement point MP1B preferably sends the value of the performance parameters (preferably, the counter c1B and the cumulative timestamp t1B) to the above mentioned management server (step 206b).

It shall be noticed that implementation of steps 202a/b and 204a/b depend on the type of interfaces IN1A, IN1B (or port, as mentioned above) and connections CA, CB.

If the interfaces IN1A, IN1B are physical interfaces, at step 202a/b the packet flow splitter PFS physically divides the packet flow PF between the two interfaces IN1A, IN1B by alternately sending the received packets to either IN1A or IN1B, which are physically separated. Hence, at step 204a/204b, the interface IN1A or IN1B in charge of transmitting the packets of the packet flow PF during the current block period may only forward the packets as received from the packet flow splitter PFS on the respective connection CA or CB, without performing any other processing on the packet.

If, instead, the interfaces IN1A, IN1B are logical interfaces, at step 202a/b the packet flow splitter PFS does not divide the packet flow PF from the physical point of view. Hence, at step 204a/204b, the interfaces IN1A and IN1B themselves shall implement a logical division of the packet flow PF by adding to each packet a connection header comprising a connection identifier, before transmission. For instance, in case the connections CA and CB are implemented as MPLS tunnels, each interface IN1A, IN1B may be a logical interface which prefixes each packet to be transmitted on the respective MPLS tunnel CA, CB with a respective MPLS header, containing at least the MPLS label of the MPLS tunnel CA or CB. As another example, the connections CA, CB may be static routes which connect network points within a same node. Also in this case, the interfaces IN1A and IN1B originating the static routes implement the logical division of the packet flow PF by adding a tag to each packet. Such tags however are valid and visible only within the node itself, because they are implementation dependent.

Figure 3:
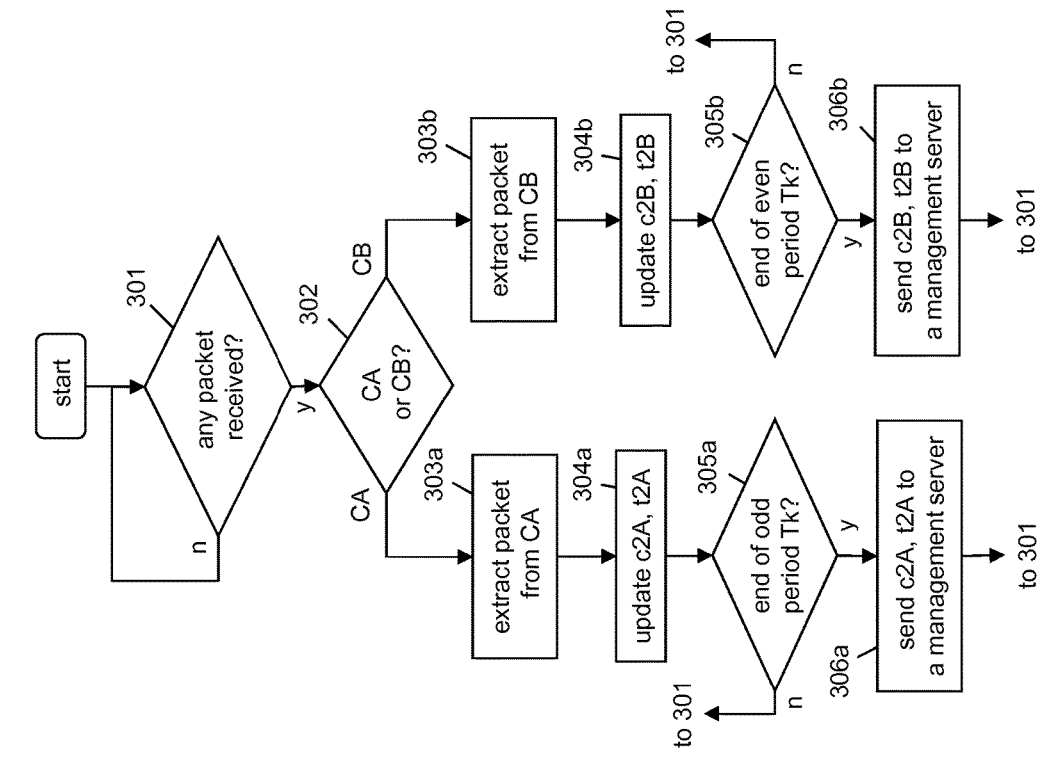
FIGS. 2 and 3 are flow charts of the operation of two nodes of the communication network shown in FIG. 1.

The operation of the node N2 according to the first embodiment of the present invention will be now described with reference to the flow chart of FIG. 3.

Upon reception of a packet (step 301) by the interface IN2A from the connection CA (step 302), the interface IN2A preferably terminates the connection CA by extracting the packet therefrom (step 303a). For instance, in case of MPLS tunnels, the interface IN2A preferably removes from each packet received on the MPLS tunnel CA the respective MPLS header, containing at least the MPLS label of the MPLS tunnel CA.

Then, the measurement point MP2A preferably updates at least one performance parameter relating to packets received from the connection CA (step 304a). The performance parameters preferably are a counter c2A counting the number of packets received by the interface IN2A from the connection CA and a cumulative timestamp t2A which is the summation of reception timestamps of packets received by the interface IN2A from the connection CA. At step 304a, the measurement point MP2A preferably increases the counter c2A by one and increases the value of the cumulative timestamp t2A by the reception time of the received packet.

Steps 303a, 304a are preferably iterated each time a packet is received by the interface IN2A from the connection CA.

Upon expiration of each odd period Tk (step 305a), the measurement point MP2A preferably sends the value of the performance parameters relating to packets received by the interface IN2A from the connection CA (preferably, the counter c2A and the cumulative timestamp t2A) to the above mentioned management server (step 306a).

When, instead, a packet is received by the interface IN2B from the connection CB, the interface IN2B preferably terminates the connection CB by extracting the packet therefrom (step 303b). For instance, in case of MPLS tunnels, the interface IN2B preferably removes from each packet received on the MPLS tunnel CB the respective MPLS header, containing at least the MPLS label of the MPLS tunnel CB.

Then, the measurement point MP2B preferably updates at least one performance parameter relating to packets received by the interface IN2B from the connection CB (step 304b). The performance parameters preferably are a counter c2B counting the number of packets received by the interface IN2B from the connection CB and a cumulative timestamp t2B which is the summation of reception timestamps of packets received by the interface IN2B from the connection CB. At step 304b, the measurement point MP2B preferably increases the counter c2B by one and increases the value of the cumulative timestamp t2B by the reception time of the received packet.

Steps 303b, 304b are preferably iterated each time a packet is received by the interface IN2B from the connection CB.

Upon expiration of each even period Tk (step 305b), the measurement point MP2B preferably sends the value of the performance parameters relating to packets received by the interface IN2B from the connection CB (preferably, the counter c2B and the cumulative timestamp t2B) to the above mentioned management server (step 306b).

Hence, according to the first embodiment, during odd periods T1, T3, T5, etc. the interface IN1A transmits packets of the packet flow PF on the connection CA and the counters c1A, c2A and average timestamps t1A, t2A are increased, whereas the connection CB is empty and the counters c1B, c2B and average timestamps t1B, t2B have fixed values. Conversely, during even periods T2, T4, T6, etc. the interface IN1B transmits packets of the packet flow PF on the connection CB and the counters c1B, c2B and average timestamps t1B, t2B are increased, whereas the connection CA is empty and the counter c1A, c2A and average timestamp t1A, t2A have fixed value.

Preferably, the management server then uses the counters c1A, c2A (for odd periods Tk) and c1B, c2B (for even periods) and/or the timestamps t1A, t2A (for odd periods Tk) or t1B, t2B (for even periods Tk) to provide performance measurements. The performance measurements may include packet loss measurements as described by WO 2010/072251 (in the name of the same Applicant), time measurements as described by WO 2011/079857 (in the name of the same Applicant) and/or average delay measurements as described by WO 2013/174417 (in the name of the same Applicant).

Therefore, advantageously, even after the connections CA, CB have been terminated by the interfaces IN2A, IN2B at the node N2, the termination of the two connections CA, CB on separate logical or physical interfaces IN2A, IN2B advantageously allows keeping the packets carried by connection CA logically or physically separated from those carried by connection CB. Then, performance parameters relating to packets extracted from each connection CA, CB are separately provided.

This advantageously allows providing separate performance measurements for each sub-flow possibly comprised in the packet flow PF.

It is assumed e.g. that the packet flow PF comprises packets having a same source address s_addr and different destination addresses, e.g. three different destination addresses d_addr1, d_addr2, d_addr3.

Since, as described above and shown in FIG. 2, the measurement points MP1A, MP1B provide the performance parameters relating to packets of the packet flow PF before the packets are inserted in the connections CA, CB by the respective interfaces IN1A, IN1B, each measurement point MP1A, MP1B may be configured to—at step 201—not only to identify the packets of the packet flow PF based on their source address value s_addr, but also to read their destination address and to provide and update one or more performance parameters for each destination address. Advantageously, since the packets have not yet been inserted in the connections CA, CB, this reading operation may be implemented at the measurement points MP1A, MP1B without making use of deep packet inspection techniques.

For instance, the measurement point MP1A may provide a set of three counters c1A(d_addr1), C1A(d_addr2), C1A(d_addr3), where c1A(d_addrx) (where x=1, 2, 3) is updated each time the measurement point MP1A detects—during an odd period Tk—a packet of the packet flow PF having destination address d_addrx.

Similarly, the measurement point MP1B may provide a set of three counters c1B(d_addr1), C1B(d_addr2), C1B(d_addr3), where c1B(d_addrx) (where x=1, 2, 3) is updated each time the measurement point MP1B detects—during an even period Tk—a packet of the packet flow PF having destination address d_addrx.

Besides, since, as described above and shown in FIG. 3, the measurement points MP2A, MP2B provide the performance parameters relating to packets of the packet flow PF after the packets have been extracted from the connections CA, CB by the respective interfaces IN2A, IN2B, each measurement point MP2A, MP2B may be configured to—at steps 304a, 304b—read the destination addresses of the packets received from the connections CA, CB and provide and update one or more performance parameters for each destination address. Advantageously, since the packets have already been extracted from the connections CA, CB, this reading operation may be implemented at the measurement points MP2A, MP2B without making use of deep packet inspection techniques.

For instance, the measurement point MP2A may provide a set of three counters c2A(d_addr1), C2A(d_addr2), C2A (d_addr3), where c2A(d_addrx) (with x=1, 2, 3) is updated each time the measurement point MP2A detects a packet received by the interface IN2A from the connection CA and having destination address d_addrx. Similarly, the measurement point MP2B may provide a set of three counters c2B(d_addr1), C2B(d_addr2), C1B(d_addr3), where c2B (d_addrx) (with x=1, 2, 3) is updated each time the measurement point MP2B detects a packet received by the interface IN2B from the connection CB and having destination address d_addrx.

The management server, for instance, may therefore provide packet loss measurements relating to packets of the packet flow PF having destination address d_addrx (with x=1, 2, 3) based on the values of the counters c1A(d_addrx), c1B(d_addrx) provided by the node N1 and the counters c2A(d_addrx), c2B(d_addrx) provided by the node N2.

Furthermore, advantageously, consistent measurements on different spans of the path followed by the packet flow to be measured may be advantageously provided.

Figure 4:
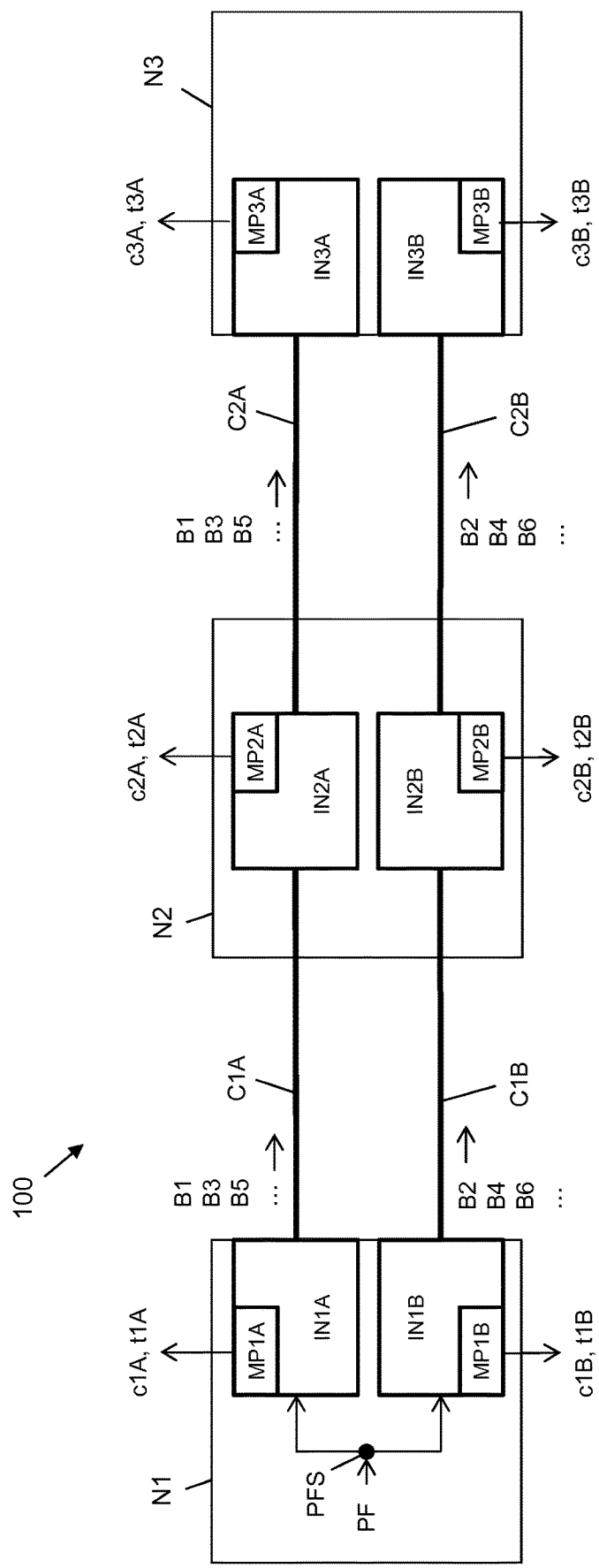
FIG. 4 schematically shows a portion of a communication network in which the method according to a second embodiment of the present invention is implemented.

FIG. 4 shows a further portion of the communication network 100, including nodes N1, N2 and N3. The nodes N1 and N2 are connected by a physical link, and also the nodes N2 and N3 are connected by a physical link. These physical links may direct or may comprise a concatenation of several physical links.

A couple of connections C1A, C1B is preferably implemented on the physical link between N1 and N2. Each connection C1A, C1B is originated by a respective interface IN1A, IN1B (physical or logical) at the node N1 and is terminated by a respective interface IN2A, IN2B (physical or logical) at the node N2.

Besides, a couple of connections C2A, C2B is preferably implemented on the physical link between N2 and N3. Each connection C2A, C2B is originated by a respective interface IN2A, IN2B (physical or logical) at the node N2 and is terminated by a respective interface IN3A, IN3B (physical or logical) at the node N3. The connections C2A, C2B preferably are of the same type (MPLS tunnels, IP over IP tunnels, TCP sessions, HTTP sessions or static routes across the communication network 100) as the connections C1A, C1B.

Herein after, it is assumed that the path followed by the packet flow PF comprises the sequence of nodes N1-N2-N3.

Assuming that performance measurements of the packet flow PF have to be made between the nodes N1 and N2 and also between the nodes N2 and N3, at the node N1 the packet flow PF is preferably divided into alternating blocks of packets B1, B2, B3, B3, B5, B6, etc. by alternately using the connections C1A and C1B, as described above.

Since, within the node N2, the interfaces IN2A, IN2B which terminate the connections C1A, C1B also originate the connections C2A, C2B, the distribution of packets amongst the connections C1A, C1B is automatically maintained also in connections C2A, C2B. Hence, the odd blocks of packets B1, B3, B5, etc. coming from connection C1A are automatically forwarded to connection C2A, while the even blocks of packets B2, B4, B6, etc. coming from the connection CB are automatically forwarded to the further connection C2B, as depicted in FIG. 4.

As to the measurement points, at node N1 the measurement points MP1A, MP1B behave substantially as described above (see flow chart of FIG. 2 and related description), thereby providing performance parameters (e.g. counters c1A, c1B and average timestamps t1A, t1B) relating to the packets of the packet flow PF to be transmitted by the interfaces IN1A, IN1B on the connections C1A, C1B, separately. At the node N2, the measurement points MP2A, MP2B behave substantially as described above (see flow chart of FIG. 3 and related description), thereby providing performance parameters (e.g. counters c2A, c2B and average timestamps t2A, t2B) relating to the packets of the packet flow PF received by the interfaces IN2A, IN2B from the connections CIA, C1B, separately. At the node N3, similarly, the measurement points MP3A, MP3B preferably behave substantially as described above (see flow chart of FIG. 3 and related description), thereby providing performance parameters (e.g. counters c3A, c3B and average timestamps t3A, t3B) relating to the packets of the packet flow PF received by the interfaces IN3A, IN3B from the connections C2A, C2B, separately.

Since, as described above, the distribution of packets amongst the connections C1A, C1B is automatically maintained also in connections C2A, C2B, the performance parameters provided by the measurement points of nodes N1, N2 and N3 are advantageously consistent.

The management server may according use these performance parameters for providing performance measurements relating to each single physical link N1-N2 and N2-N3, but also for providing performance measurements relating to the whole span N1-N3. For instance, the management server may provide the following performance measurements:

packet loss between N1 and N2 based on counters c1A, c1B provided by N1 and counters c2A, c2B provided by N2;

packet loss between N2 and N3 based on counters c2A, c2B provided by N2 and counters c3A, c3B provided by N3; and packet loss between N1 and N3 based on counters c1A, c1B provided by N1 and counters c3A, c3B provided by N3.

If the packet flow PF is a multipoint packet flow as defined above, concatenation of several couples of connections may be applied to provide performance measurements on meshed portions of the path followed by the packet flow PF though the communication network 100.

Figure 5:
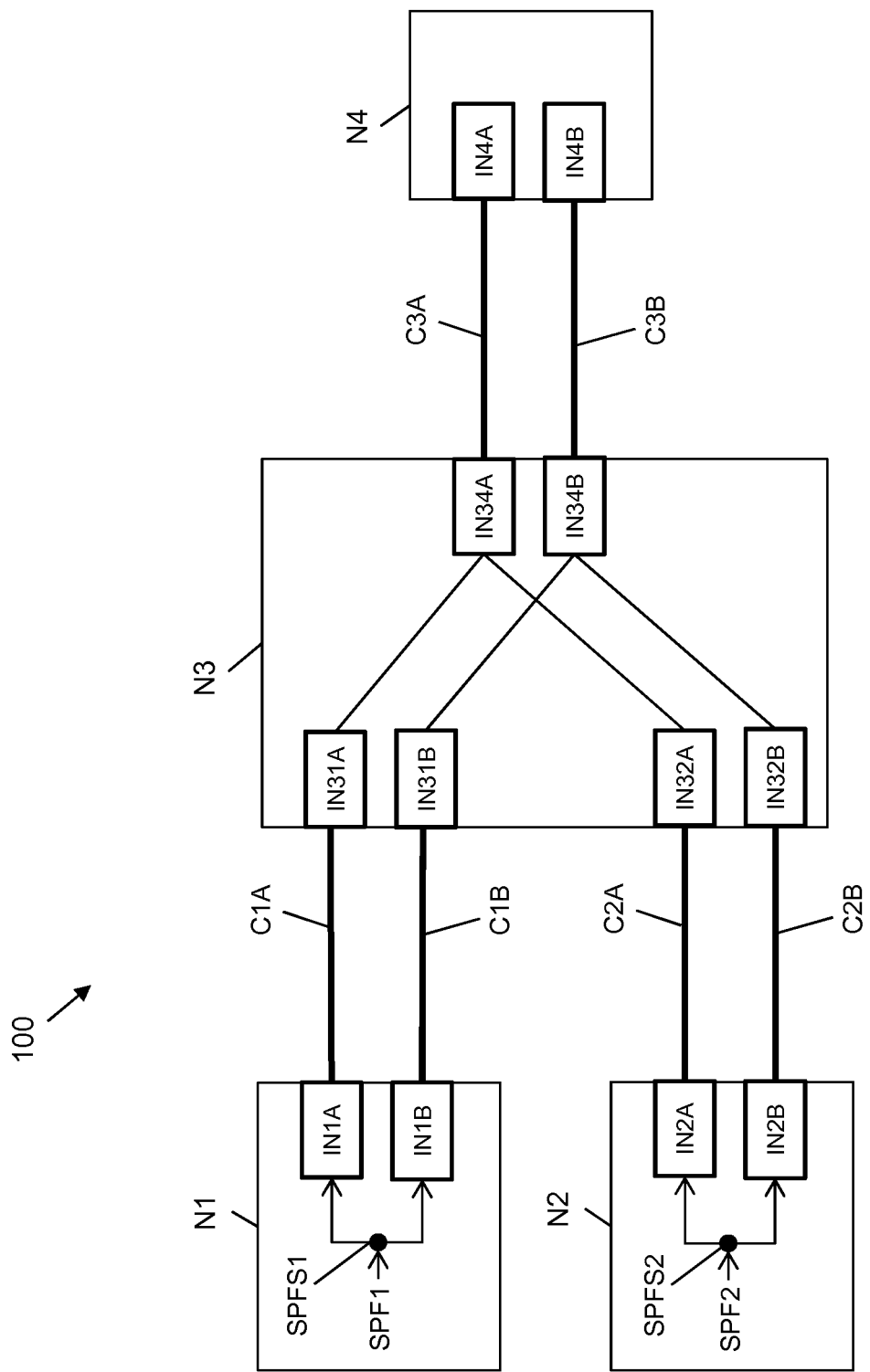
FIG. 5 schematically shows a portion of a communication network in which the method according to a third embodiment of the present invention is implemented.

For instance, FIG. 5 relates to a scenario where the packet flow PF is a multipoint packet flow made of packets having different sources addresses (e.g. a discrete set of source addresses or a continuous range of addresses) and a same destination address.

The portion of communication network 100 shown in FIG. 5 comprises four nodes N1, N2, N3 and N4 arranged according to a tree topology. In particular, the nodes N1 and N2 are both connected to the node N3 via respective physical links (e.g. optical links), while node N3 is connected to the node N4 via a further optical link.

A couple of connections is preferably implemented on each physical link between nodes N1, N2, N3, N4, namely:
- connections C1A, C1B on the physical link between N1 and N3, each connection C1A, C1B being originated by a respective interface IN1A, IN1B (physical or logical) at N1 and being terminated by a respective interface IN31A, IN31B (physical or logical) at the node N3;
- connections C2A, C2B on the physical link between N2 and N3, each connection C2A, C2B being originated by a respective interface IN2A, IN2B (physical or logical) at N1 and being terminated by a respective interface IN32A, IN32B (physical or logical) at the node N3; and
- connections C3A, C3B on the physical link between N3 and N4, each connection C3A, C3B being originated by a respective interface IN34A, IN34B (physical or logical) at N3 and being terminated by a respective interface IN4A, IN4B (physical or logical) at the node N4.

All the connections preferably are of the same type (MPLS tunnels, IP over IP tunnels, TCP sessions, HTTP sessions or static routes across the communication network 100).

Each node N1 and N2 is also preferably provided with a respective packet sub-flow splitter SPFS1 and SPFS2 connected to the interfaces IN1A, IN1B and IN2A, IN2B, respectively. Each interface at nodes N1, N2, N3 and N4 is preferably provided with a respective measurement point (not shown in FIG. 5 for not overloading the drawing).

Within the node N3, the interfaces IN31A and IN32A (which terminate the connections C1A and C2A, respectively) are connected to the interface IN34A (which originates the connection C3A) so that every packet received at the interface IN31A or IN32A is automatically forwarded to the interface IN34A. Similarly, the interfaces IN31B and IN32B (which terminate the connections C1B and C2B, respectively) are connected to the interface IN34B (which originates the connection C3B) so that every packet received at the interface IN31B or IN32B is automatically forwarded to the interface IN34B. Hence, basically, connections C1A and C2A are merged and connection C3A is concatenated thereto and, in parallel, connections C13B and C2B are merged and connection C3B is concatenated thereto.

Though FIG. 5 shows a concatenation of couples of connections terminated and originated within the same node N3, according to other embodiments of the present invention (not shown in the drawings) concatenation may be implemented between couples of connections originated and terminated at different nodes of the path followed by the packet flow PF, e.g. by static routes set up through the communication network 100, possibly through any intermediate nodes.

Herein after, it is assumed that the packet flow PF comprises a first sub-flow SPF1 of packets whose path passes through nodes N1-N3-N4, and a second sub-flow SPF2 of packets whose path passes through nodes N2-N3-N4.

Assuming that performance measurements of the packet flow PF have to be made, at the node N1 the sub-flow SPF1 is preferably divided into alternating blocks of packets by alternately using the connections C1A and C1B, as described above. Similarly, at the node N2, the sub-flow SPF2 is preferably divided into alternating blocks of packets by alternately using the connections C2A and C2B, as described above.

Since, within the node N3, the interfaces terminating the connections C1A, C1B and C2A, C2B are connected with the interfaces originating the connections C3A, C3B as described above, the distribution of packets amongst the connections C1A, C1B and C2A, C2B is automatically maintained also in connections C3A, C3B. Hence, packets coming from both C1A and C2A are automatically forwarded C3A, while packets coming from both C1B and C2B are automatically forwarded C3B.

As to the measurement points, at node N1 the measurement points of interfaces IN1A, IN1B behave substantially as described above (see flow chart of FIG. 2 and related description), thereby providing performance parameters (e.g. counters and average timestamps) relating to the packets of the sub-flow SPF1 to be transmitted by the interfaces IN1A, IN1B on the connections C1A, C1B, separately. Similarly, at the node N2 the measurement points of interfaces IN2A, IN2B behave substantially as described above (see flow chart of FIG. 2 and related description), thereby providing performance parameters (e.g. counters and average timestamps) relating to the packets of the sub-flow SPF2 to be transmitted by the interfaces IN2A, IN2B on the connections C2A, C2B, separately.

At the node N3, the measurement points of the interfaces IN31A, IN31B behave substantially as described above (see flow chart of FIG. 3 and related description), thereby providing performance parameters (e.g. counters and average timestamps) relating to the packets of the sub-flow SPF1 received by the interfaces IN31A, IN31B from connections C1A, C1B, separately. Similarly, the measurement points of the interfaces IN32A, IN32B behave substantially as described above (see flow chart of FIG. 3 and related description), thereby providing performance parameters (e.g. counters and average timestamps) relating to the packets of the sub-flow SPF2 received by the interfaces IN32A, IN32B from connections C2A, C2B, separately. Besides, the measurement points of interfaces IN34A, IN34B behave substantially as described above (see flow chart of FIG. 2 and related description), thereby providing performance parameters (e.g. counters and average timestamps) relating to packets of the sub-flow SPF1 and packets of the sub-flow SPF2 (namely, the whole packet flow PF) to be transmitted by the interfaces IN34A, IN34B on the connections C3A, C3B, separately.

Finally, at the node N4 the measurement points of the interfaces IN4A, IN4B behave substantially as described above (see flow chart of FIG. 3 and related description), thereby providing performance parameters (e.g. counters and average timestamps) relating to the packets of the packet flow PF received by the interfaces IN4A, IN4B from connections C3A, C3B, separately.

The above mentioned management server may use the performance parameters provided by the various measurement points of nodes N1, N2, N3, N4 to provide performance measurements on the packet flow PF.

Such performance measurements may relate to each single physical link between the nodes N1, N2, N3, N4. For instance, the aforementioned management server may provide the following performance measurements:
- packet loss measurement between nodes N1 and N3, based on counters provided by the measurement points of interfaces IN1A, IN1B of node N1 and counters provided by the measurement points of interfaces IN31A, IN31B of node N3;
- packet loss measurement between nodes N2 and N3, based on counters provided by the measurement points of interfaces IN2A, IN2B of node N2 and counters provided by the measurement points of interfaces IN32A, IN32B of node N3; and packet loss measurement between nodes N3 and N4, based on counters provided by the measurement points of interfaces IN34A, IN34B of node N3 and counters provided by the measurement points of interfaces IN4A, IN4B of node N4.

The management server may also, based on such performance parameters, provide performance measurements relating to clusters.

Preferably, a cluster is defined as a set of interfaces (or, more generally, network points originating or terminating connections as defined above) which exhibits the property that the ensemble of the packets received at the input interface(s) of the cluster is the same as the ensemble of the packets received at the output interface(s) of the cluster, if no packet loss occurs.

With reference to FIG. 5, at least two clusters may be envisaged, namely:

a first cluster CL1 (shown in FIG. 6a) whose inputs are the interfaces IN1A, IN1B of N1 and the interfaces IN2A, IN2B of N2 and whose outputs are the interfaces IN34A, IN34B of N3; and a second cluster CL2 (shown in FIG. 6b) whose inputs are the interfaces IN1A, IN1B of N1 and the interfaces IN2A, IN2B of N2 and whose outputs are the interfaces IN4A, IN4B of N4.

Since, by definition of cluster, the packets at the input of a cluster are the same as at the output of a cluster (short of packet loss events) and since, as discussed above, the couples of connections are concatenated to as to preserve the distribution of packets of the packet flow PF (and its sub-flows) between the two connections of each couple, the performance parameters provided by the measurement points of the input interfaces of the cluster is advantageously commensurable with the performance parameters provided by the measurement points of the output interfaces of the same cluster. These performance parameters may accordingly be combined to provide performance measurements relating to each cluster.

Figure 6B:
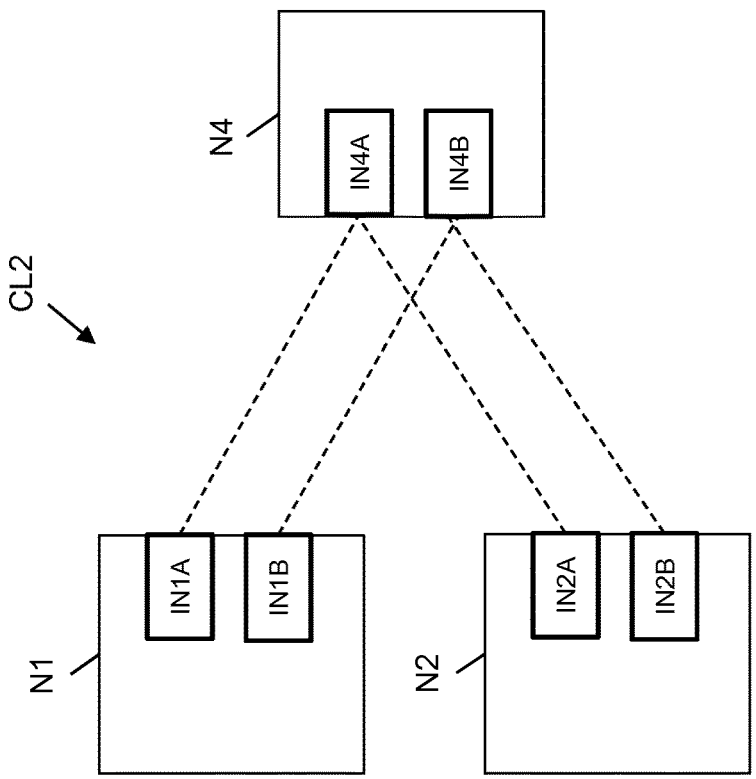
FIGS. 6a and 6b show exemplary clusters of the communication network of FIG. 5.
Figure 6A:
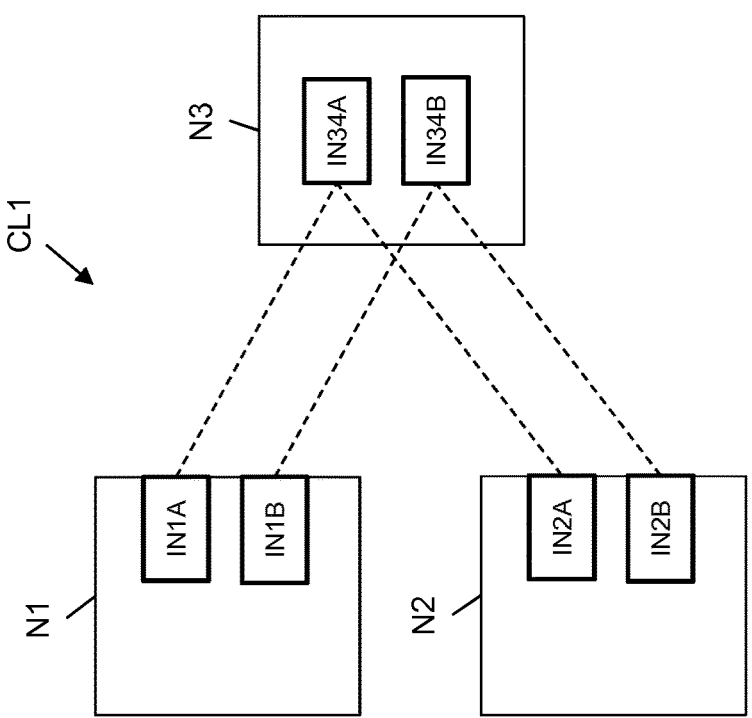

With reference to FIGS. 6a and 6b, the management server may for instance provide the following performance measurements:

packet loss measurement of cluster CL1, based on counters provided by the measurement points of interfaces IN1A, IN1B of node N1 and counters provided by the measurement points of interfaces IN2A, IN2B of node N on the input side, and counters provided by the measurement points of interfaces IN34A, IN34B of node N3 on the output side; and packet loss measurement of cluster CL2, based on counters provided by the measurement points of interfaces IN1A, IN1B of node N1 and counters provided by the measurement points of interfaces IN2A, IN2B of node N2 on the input side, and counters provided by the measurement points of interfaces IN4A, IN4B of node N4 on the output side.

Though reference has been made to packet loss measurements only, also measurements of average one-way delay can be performed for each cluster, based on the cumulative timestamps provided by the measurements points at the input and output of each cluster.

Alternate use of a couple of connections to divide the packet flow to be measured, as described above, entails that—during each period Tk (k=1, 2, 3, 4, 5, 6, etc.)—one of the two connections is empty, namely it does not transmit any packet of the packet flow PF to be measured. Especially if the interfaces separately originating and terminating the two connections are physical interfaces, such non optimal usage of the transmission resources (bandwidth) is undesirable.

According to a particularly advantageous variant of the present invention, in case the packet flow PF to be measured is a multipoint packet flow, its packets are distributed between the coupled connections so as to statistically balance use of the two connections during every period Tk.

Figure 7:
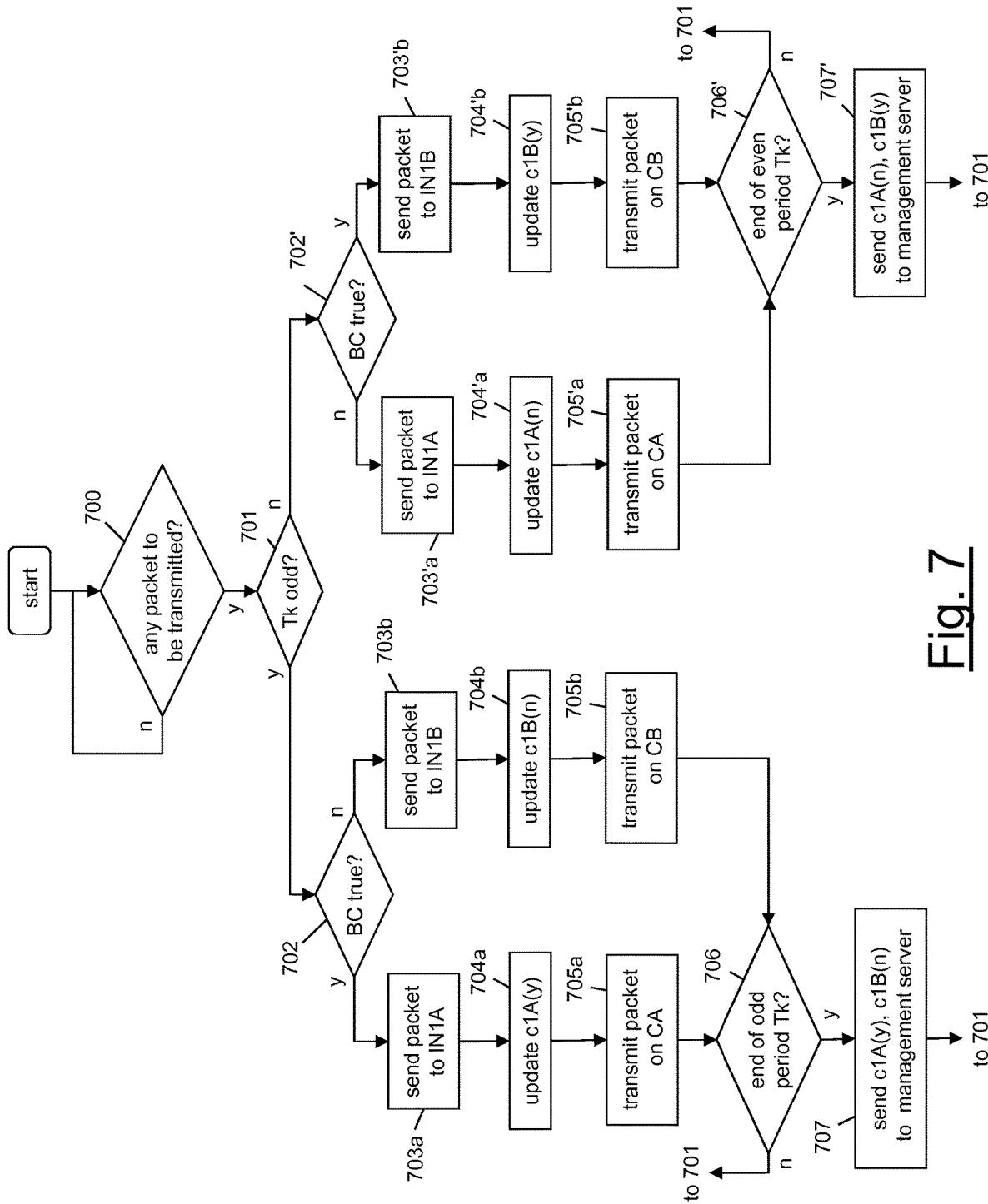
FIGS. 7 and 8 are flow charts of the method according to a fourth embodiment of the invention.

According to such advantageous variant, in particular, as shown in FIG. 7, the node N1 preferably waits for possible packets of the packet flow PF to be measured (step 700). It is assumed that the packet flow PF comprises packets having a different source addresses, e.g. comprised in a certain continuous range of values. Hence, at step 700 the node N1 preferably identifies the packets of the packet flow PF based on the value of their source addresses.

Upon identification of a packet of the packet flow PF, the packet flow splitter PFS of the node N1 preferably checks whether the current block period Tk (k=1, 2, 3, 4, 5, 6, etc.) is an even period or an odd period (step 701).

The packet flow splitter PFS of the node N1 also preferably checks whether a certain balancing condition BC is fulfilled or not by the received packet (steps 702, 702'). The balancing condition BC is preferably chosen so that, statistically, 50% of packets of the packet flow PF fulfil such conditions and 50% of packets does not fulfil it. For instance, the balancing condition BC may be "source address odd", assuming that—statistically—50% of the packets of the packet flow PF have odd source addresses and 50% of packets of the packet flow PF have even source addresses.

If Tk is an odd period and the received packet fulfils the balancing condition BC, the packet flow splitter PFS preferably forwards the packet to the interface IN1A (step 703a). Then, the measurement point MP1A preferably updates at least one performance parameter relating to packets to be transmitted by the interface IN1A on the connection CA and fulfilling the balancing condition BC (step 704a). At step 704a, the measurement point MP1A for instance may increase by one a counter c1A(y) counting the number of packets to be transmitted by the interface IN1A on the connection CA and fulfilling the balancing condition BC. The packet is then transmitted by the interface IN1A on the connection CA towards the node N2 (step 705a).

If, instead, Tk is an odd period and the received packet does not fulfil the balancing condition BC, the packet flow splitter PFS preferably forwards the packet to the interface IN1B (step 703b). Then, the measurement point MP1B preferably updates at least one performance parameter relating to packets to be transmitted by the interface IN1B on the connection CB and not fulfilling the balancing condition BC (step 704b). At step 704b, the measurement point MP1B for instance may increase by one a counter c1B(n) counting the number of packets to be transmitted by the interface IN1B on the connection CB and not fulfilling the balancing condition BC. The packet is then transmitted by the interface IN1B on the connection CB towards the node N2 (step 705b).

Steps 702, 703a/b, 704a/b and 705a/b are preferably iterated each time a packet of the packet flow PF is identified, until the end of the period Tk (step 706).

Upon expiration of the odd period Tk, the measurement points MP1A and MP1B preferably send the value of the performance parameters (the counters c1A(y) and c1B(n), respectively) to the management server (step 707).

If Tk is an even period and the received packet does not fulfil the balancing condition BC, the packet flow splitter PFS preferably forwards the packet to the interface IN1A (step 703'*a*). Then, the measurement point MP1A preferably updates at least one performance parameter relating to packets to be transmitted by the interface IN1A on the connection CA and not fulfilling the balancing condition BC (step 704'*a*). At step 704'*a*, the measurement point MP1A for instance may increase by one a counter c1A(n) counting the number of packets to be transmitted by the interface WA on the connection CA and not fulfilling the balancing condition BC. The packet is then transmitted by the interface IN1A on the connection CA towards the node N2 (step 705'*a*).

If, instead, Tk is an even period and the received packet fulfils the balancing condition BC, the packet flow splitter PFS preferably forwards the packet to the interface IN1B (step 703'*b*). Then, the measurement point MP1B preferably updates at least one performance parameter relating to packets to be transmitted by the interface IN1B on the connection CB and fulfilling the balancing condition BC (step 704'*b*). At step 704'*b*, the measurement point MP1B for instance may increase by one a counter c1B(y) counting the number of packets to be transmitted by the interface IN1B on the connection CB and fulfilling the balancing condition BC. The packet is then transmitted by the interface IN1B on the connection CB towards the node N2 (step 705'*b*).

Steps 702', 703'*a/b*, 704'*a/b* and 705'*a/b* are preferably iterated each time a packet of the packet flow PF is identified, until the end of the period Tk (step 706').

Upon expiration of the even period Tk, the measurement points MP1A and MP1B preferably send the value of the performance parameters (the counters c1A(n) and c1B(y), respectively) to the management server (step 707').

Figure 9:
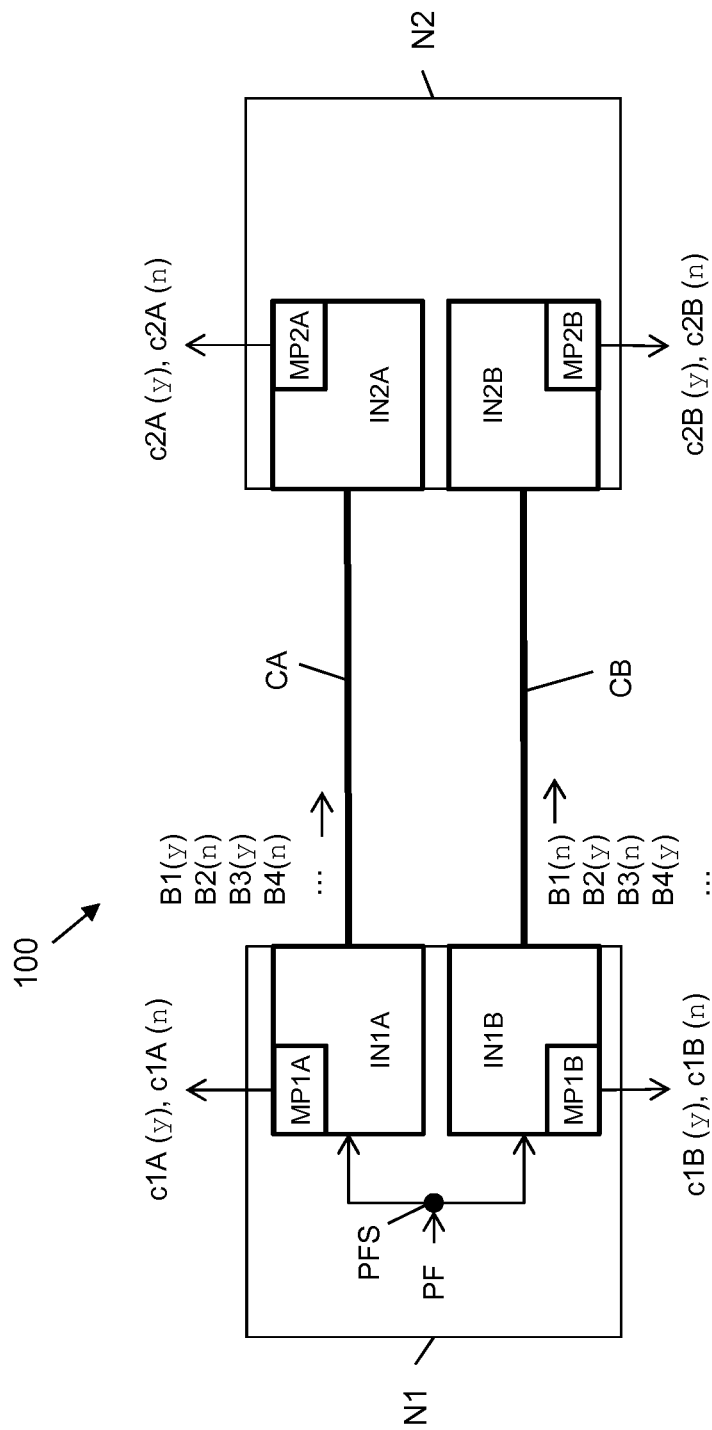
FIG. 9 schematically shows a portion of a communication network in which the method according to the fourth embodiment of the present invention is implemented.

Hence, as schematically depicted in FIG. 9, during odd periods Tk, the interface IN1A transmits on the connection CA odd blocks B1(y), B3(y), etc. of packets fulfilling the balancing condition BC and, in the meanwhile, the interface IN1B transmits on the connection CB odd blocks B1 (n), B3(n), etc. of packets not fulfilling the balancing condition BC. Conversely, during even periods Tk, the interface IN1A transmits on the connection CA even blocks B2(n), B4(n), etc. of packets not fulfilling the balancing condition BC and, in the meanwhile, the interface IN1B transmits on the connection CB even blocks B2(y), B4(y), etc. of packets fulfilling the balancing condition BC.

Therefore, at each period Tk, both the interfaces IN1A, IN1B originating the parallel connections CA, CB are advantageously used for transmitting packets of the packet flow to be measured.

Figure 8:
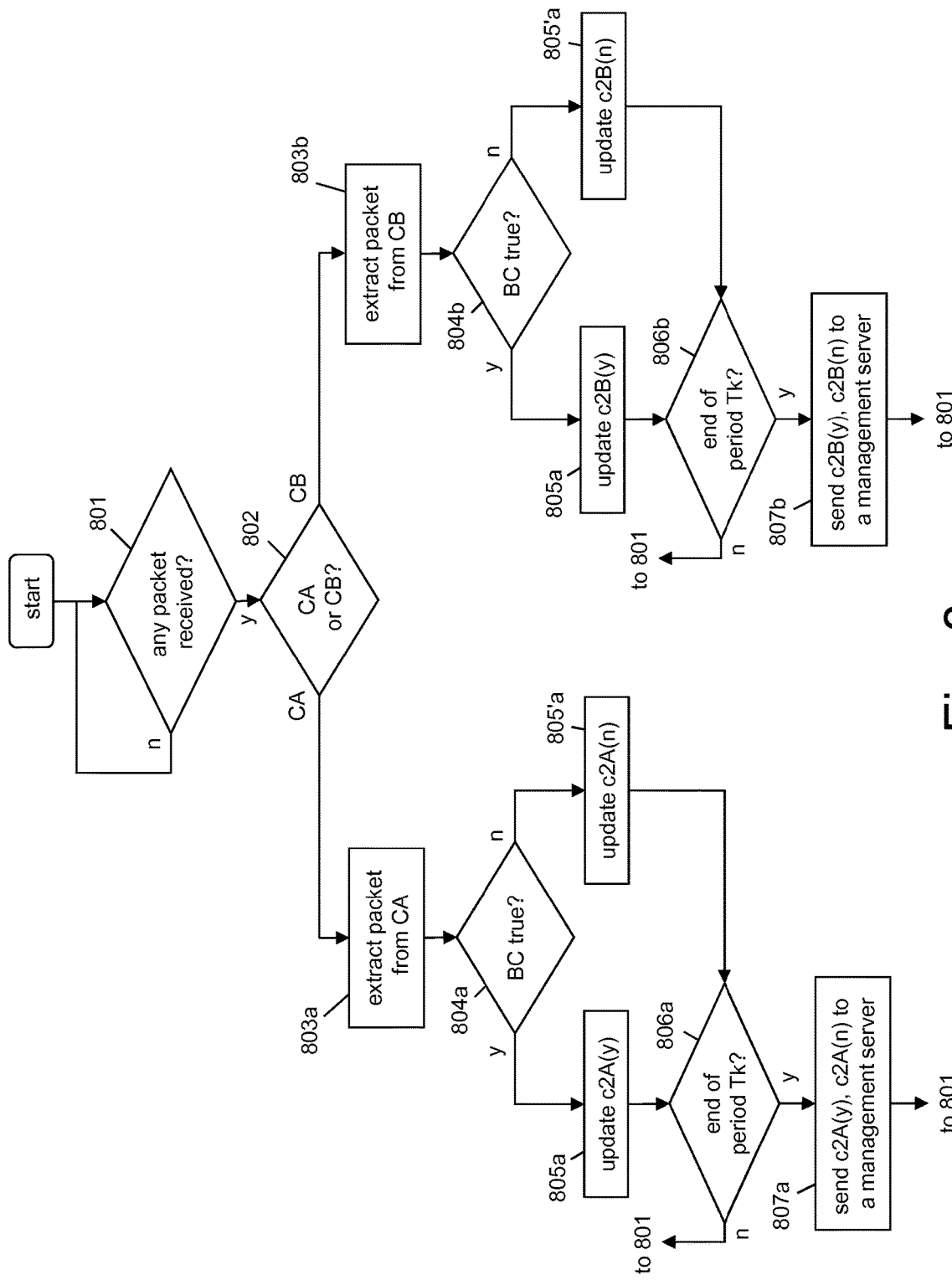

As to the node N2, according to this advantageous variant upon reception of a packet from N1 (step 801 in FIG. 8), if the packet has been received by the interface IN2A from the connection CA (step 802), the interface IN2A preferably terminates the connection CA by extracting the packet therefrom (step 803*a*).

Then, the measurement point MP2A preferably checks whether the packet fulfils the balancing condition BC (step 804*a*).

In the affirmative, the measurement point MP2A preferably updates at least one performance parameter relating to packets received by the interface IN2A from the connection CA and fulfilling the balancing condition BC (step 805*a*). At step 805*a*, the measurement point MP2A for instance may increase by one a counter c2A(y) counting the number of packets received by the interface IN2A from the connection CA and fulfilling the balancing condition BC. In the negative, the measurement point MP2A preferably updates at least one performance parameter relating to packets received by the interface IN2A from the connection CA and not fulfilling the balancing condition BC (step 805'*a*). At step 805'*a*, the measurement point MP2A for instance may increase by one a counter c2A(n) counting the number of packets received by the interface IN2A from the connection CA and not fulfilling the balancing condition BC.

Steps 803*a*, 804*a*/804'*a* and 805*a*/805'*a* are preferably iterated each time a packet is received by the interface IN2A from the connection CA.

Upon expiration of the period Tk (step 806*a*), the measurement point MP2A preferably sends the value of the counters c2A(y) and c2A(n) to the management server (step 807*a*).

If, instead, a packet has been received by the interface IN2B from the connection CB, the interface IN2B preferably terminates the connection CB by extracting the packet therefrom (step 803*b*).

Then, the measurement point MP2B preferably checks whether the packet fulfils the balancing condition BC (step 804*b*).

In the affirmative, the measurement point MP2B preferably updates at least one performance parameter relating to packets received by the interface IN2B from the connection CB and fulfilling the balancing condition BC (step 805*b*). At step 805*b*, the measurement point MP2A for instance may increase by one a counter c2B(y) counting the number of packets received by the interface IN2B from the connection CB and fulfilling the balancing condition BC. In the negative, the measurement point MP2B preferably updates at least one performance parameter relating to packets received by the interface IN2B from the connection CB and not fulfilling the balancing condition BC (step 805'*b*). At step 805'*b*, the measurement point MP2B for instance may increase by one a counter c2B(n) counting the number of packets received by the interface IN2B from the connection CB and not fulfilling the balancing condition BC.

Steps 803*b*, 804*b*/804'*b* and 805*b*/805'*b* are preferably iterated each time a packet is received from the connection CB.

Upon expiration of the period Tk (step 806*b*), the measurement point MP2B preferably sends the value of the counters c2B(y) and c2B(n) to the management server (step 807*b*).

The management server may then use the received performance parameters for providing performance measurement on the link between N1 and N2. At this purpose, the performance parameters relating to packets which have been transmitted by the interfaces IN1A, IN2B originating the parallel connections CA, CB during a same period Tk are preferably merged, before they are used for the performance measurements calculation. For instance, with reference to a packet loss measurement, the counters c1A(y) and c1B(n) relating to a same odd period Tk (k=1, 3, 5, etc.) are summed up to provide a single counter c1, the counters c2A(y) and c2B(n) relating to the same odd period Tk are summed up to provide a single counter c2, and then the packet loss for that odd period Tk is calculated as a difference between c1 and c2. Similarly, the counters c1A(n) and c1B(y) relating to a same even period Tk (k=2, 4, 6, etc.) are summed up to provide a single counter c1, the counters c2A(n) and c2B(y) relating to the same even period Tk are summed up to provide a single counter c2, and then the packet loss for that even period Tk is calculated as a difference between c1 and c2. If the packet flow PF comprises two sub-flows SPF1, SPF2 (e.g. identified by two different sources addresses s_addr1 and s_addr2), the load balancing technique described above may also be used for providing separate performance measurements for the two sub-flows.

To this purpose, a balancing condition BC is preferably set on the source address of the incoming packets, such that each sub-flow is entirely transmitted by a same interface on a same connection during each period Tk. The balancing condition BC mat be for instance "source address=s_addr1". This way, with reference e.g. to the flow charts of FIGS. 7 and 8, during odd periods T1, T3, etc. the interface IN1A transmits on the connection CA all the incoming packets of the packet sub-flow SPF1 while the interface IN1B transmits on the connection CB all the incoming packets of the packet sub-flow SPF2. Conversely, during even periods T2, T4, etc. the interface IN1A transmits on the connection CA all the incoming packets of the packet sub-flow SPF2 while the interface IN1B transmits on the connection CB all the incoming packets of the packet sub-flow SPF1.

Hence, the counters c1A(y), c1B(y) and c2A(y), c2B(y) relate to packets of the packet sub-flow SPF1 during odd periods and during even periods, and may accordingly be directly used by the management server to provide performance measurements on the packet sub-flow SPF1. Similarly, the counters c1A(n), c1B(n) and c2A(n) and c2B(n) relate to packets of the packet sub-flow SPF2 during even periods and during odd periods, and may accordingly be directly used by the management server to provide performance measurements on the packet sub-flow SPF2.

Figure 10:
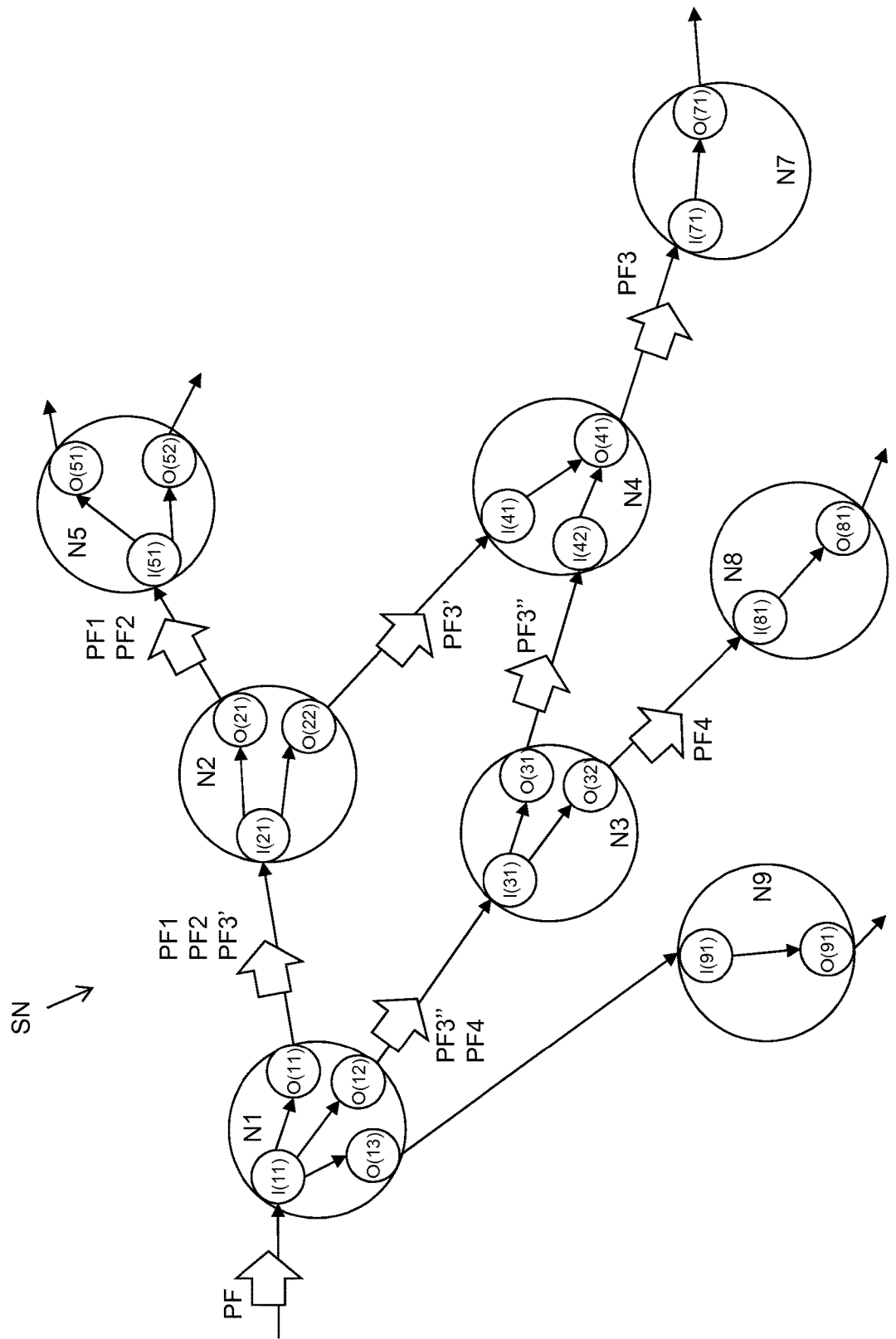
FIGS. 10, 11 and 12 show exemplary connectionless network scenarios in which the method according to embodiments of the invention is applicable.

FIG. 10 schematically shows an exemplary connectionless subnetwork SN, in which the method for performing a performance measurement according to embodiments of the present invention is implemented.

The subnetwork SN comprises nodes N1, N2, . . . , N5, N7, N8, N9 reciprocally interconnected according to a partially meshed topology. In particular, node N1 is connected to N2, N3 and N9, node N2 is connected to N4 and N5, node N3 is connected to N4 and N8, node N4 is connected to N7.

The nodes N1, N2, . . . , N5, N7, N8, N9 comprise input and output interfaces reciprocally interconnected by physical links. In particular:

N1 comprises an input interface I(11), a first output interface O(11) connected to an input interface I(21) of N2, a second output interface O(12) connected to an input interface I(31) of N3 and a third output interface O(13) connected to an input interface I(91) of N9;

N2 comprises a first output interface O(21) connected to an input interface I(51) of N5 and a second output interface O(22) connected to an input interface I(41) of N4;

N3 comprises a first output interface O(31) connected to an input interface I(42) of N4 and a second output interface O(32) connected to an input interface I(81) of N8;

N4 comprises an output interface O(41) connected to an input interface I(71) of N7;

N5 comprises two output interfaces O(51), O(52); and

N7, N8 and N9 comprise respective output interfaces O(71), O(81) and O(91).

The subnetwork SN supports transmission of a multipoint packet flow PF comprising packets having e.g. a same source address and different destination addresses. The packet flow PF in particular comprises:

a packet sub-flow PF1 originated at the input interface I(11) of N1 and addressed to the output interface O(51) of N5;

a packet sub-flow PF2 originated at the input interface I(11) of N1 and addressed to the output interface O(52) of N5;

a packet sub-flow PF3 originated at the input interface I(11) of N1 and addressed to the output interface O(71) of N7, a packet sub-flow PF4 originated at the input interface I(11) of N1 and addressed to the output interface O(81) of N8; and a packet sub-flow PF5 originated at the input interface I(11) of N1 and addressed to the output interface O(91) of N9.

Figure 11:
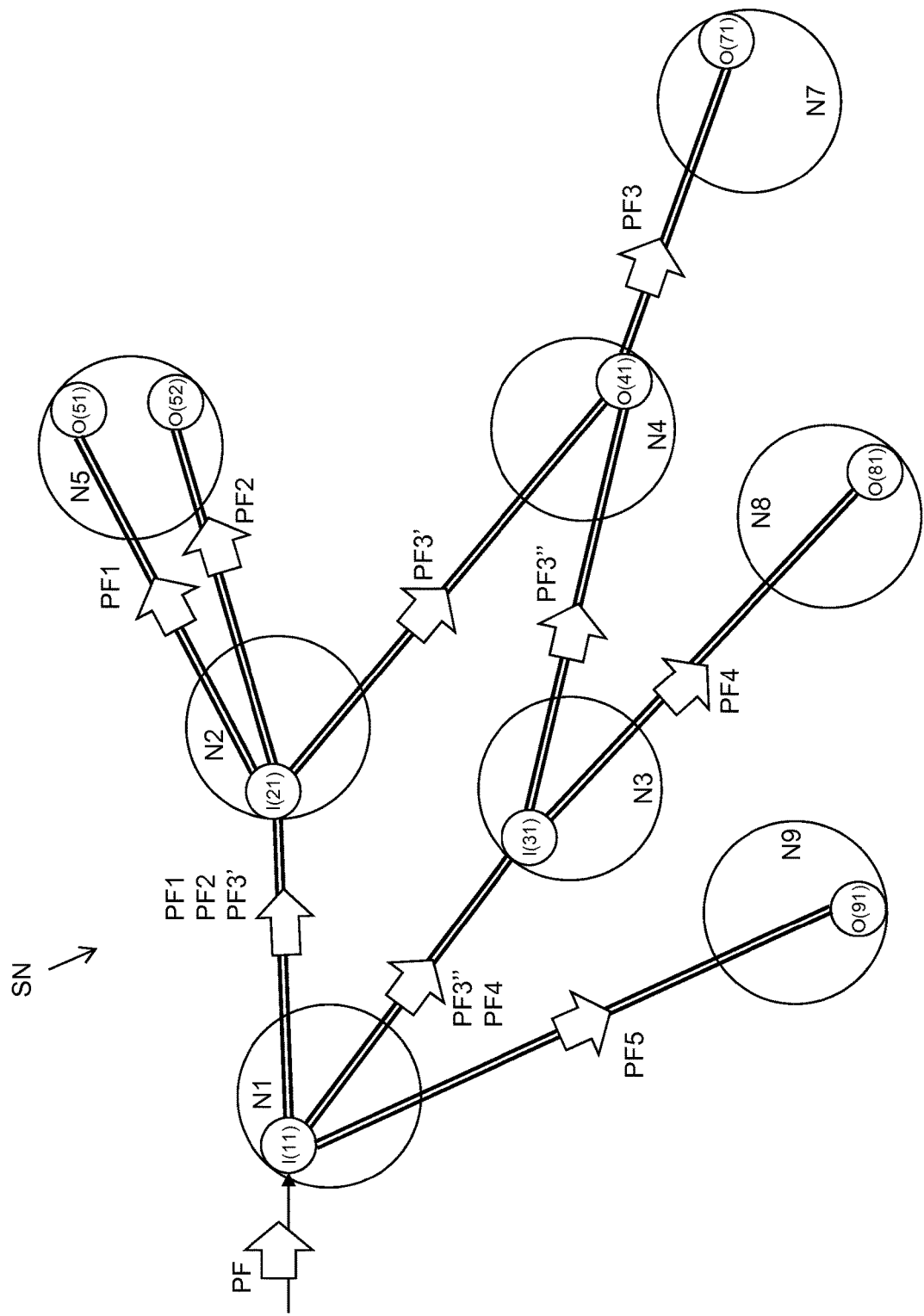

In order to support transmission of the packet flow PF, a number of connections (e.g. IP or MPLS tunnels) is already set up in the connectionless subnetwork SN. The tunnels are depicted in FIG. 11 by double lines.

For example, performance measurements on packet flow PF and each sub-flow comprised therein may be performed in the subnetwork SN, by:

for each tunnel supporting transmission of the packet flow PF within the subnetwork SN, providing a corresponding couple of connections originated by and terminated by respective logical or physical interfaces. To this purpose, for instance, two logical connections (e.g. IP or MPLS tunnels) may be implemented on each tunnel shown in FIG. 11, the two logical connections being originated and terminated by respective logical interfaces (IP or MPLS interfaces) implemented at the interface originating and terminating the tunnel. Alternatively, each tunnel may be "duplicated" by providing a parallel tunnel and interfaces originating and terminating it (e.g. the tunnel between I(11) and I(21) may be duplicated by providing a parallel tunnel between an interface I(11)' co-located with I(11) and an interface I(21') co-located with I(21); and providing each interface originating or terminating a connection with a respective measurement point.

In addition, the node N1—through which the packet flow enters the subnetwork SN—is preferably provided with a packet flow splitter (not shown in the drawings) for dividing the packets of the packet flow PF into alternating blocks of packets as described above. Similarly, each node through which at least one of the sub-flows of the packet flow PF exits the subnetwork SN is preferably provided with a packet flow merger (not shown in the drawings) for merging again the packets of the packet flow PF.

This way, performance parameters are advantageously provided by the measurement points based on the alternating marking principle, which allow providing performance measurements relating to transmission of packets between interfaces connected by a couple of connections.

Figure 12:
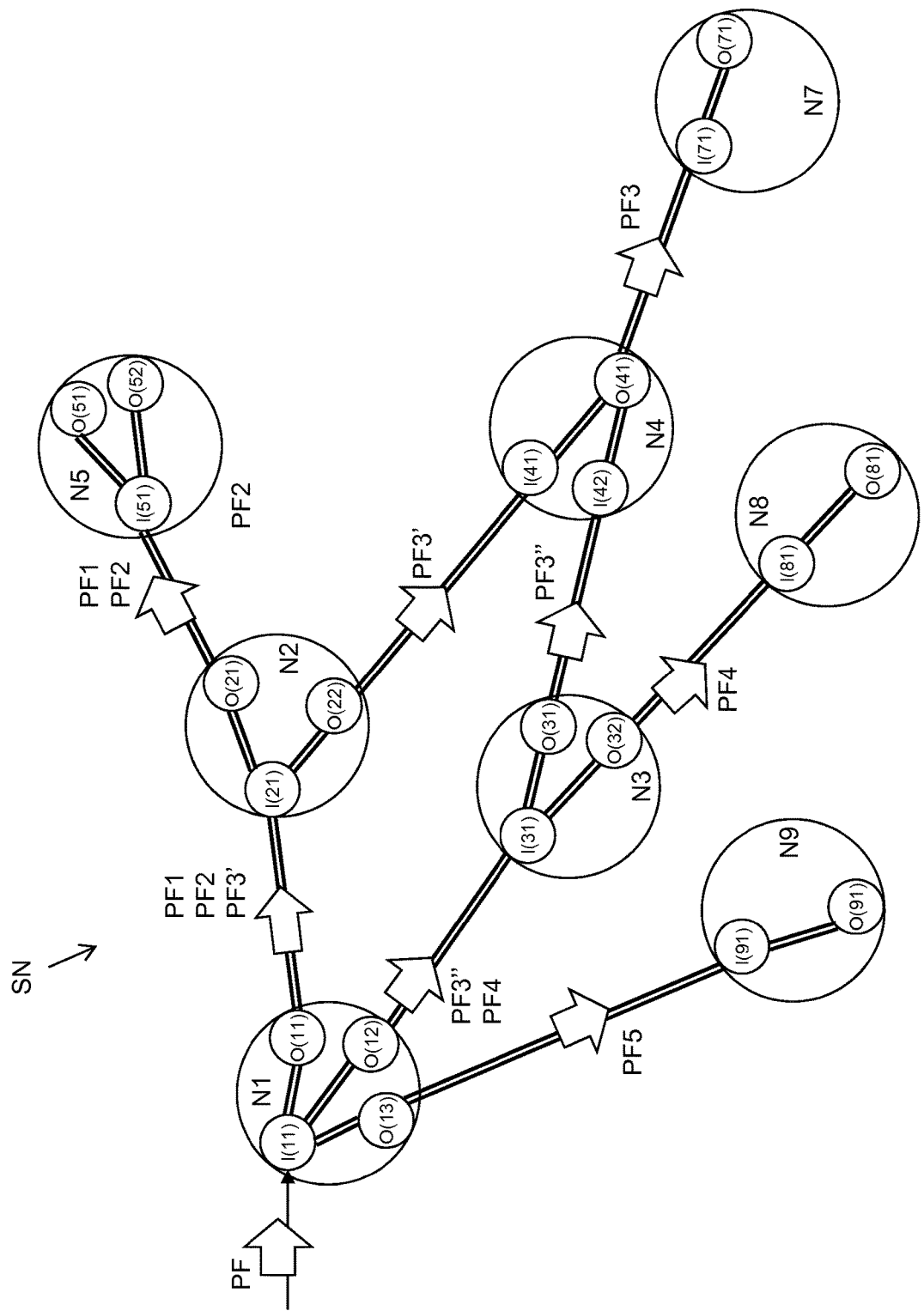

FIG. 12 shows a further application of the method according to the present invention in the connectionless scenario of FIG. 10. In such scenario, a couple of connections for performance measurement purposes is implemented on each single hop (e.g. IP hop, in case of IP networks) between adjacent interfaces of the subnetwork SN. In particular, a couple of connections (shown by double lines in FIG. 12) may be provided for each hop of the subnetwork SN, independently of whether the hop is within a node (namely, it connects an input interface of the node with an output interface of the same node) or external to nodes (namely, it connects the output interface of a node with an input interface of another node).

Though in the preceding description reference has been made to couples of connections alternately used at the purpose of dividing the packet flow to be measured in alternating blocks, according to other embodiments multiple couples of connections may be implemented on a same link, each connection being originated by a respective network point and being terminated by a respective network point.

The multiple couples may be used for different purposes. For instance, by using two couples of connections, the packet flow to be measured may be divided into alternating blocks and, at the same time, within each block one or more sample packet to be singularly subjected e.g. to a delay measurement may be identified. In such case, a first couple of connections may be used for alternately transmitting the sub-flow of packets not to be subjected to the delay measurement, while the second couple of connections may be used for alternately transmitting the sub-flow of sample packets.

As another example, in case e.g. of a multipoint scenario, a separate couple of connections may provided for alternately transmitting each sub-flow comprised in the multipoint packet flow.

In view of the above, it is therefore apparent that the performance measurement method according to embodiments of the present invention (based on alternate use of couples of connections originated by separate interfaces and terminating on separate interfaces) exhibits the same advantages at a performance measurement method wherein the alternate marking is based on the value of a marking bit, namely:
  performance measurements are immune to reception sequence errors;
  performance measurements may be performed in loosely synchronized networks (no accurate synchronization is required between the local clocks of the nodes); and
  possibility to mark the same packet flow in different points of the network (based on different clocks).

If different couples of connections are concatenated as described above, other advantages are achieved, namely:
  each packet is marked once and its marking is preserved through the whole concatenation.

If a balancing condition is also applied, other advantages are achieved, namely:
  traffic balancing is preserved along the whole concatenation of couples of connections; and
  bandwidth is more efficiently used, especially when the interfaces originating and terminating the parallel connections are physical interfaces.

The invention claimed is:

1. A method for performing a performance measurement on a packet flow transmitted in a communication network, said method comprising:
  a) alternately transmitting packets of said packet flow on a first connection and second connection set up through said communication network;
  b) providing a first transmission performance parameter and a second transmission performance parameter relating to said packets as transmitted alternately on said first connection and said second connection, respectively;
  c) providing a first reception performance parameter and a second reception performance parameter relating to said packets as received alternately from said first connection and said second connection, respectively; and
  d) providing a performance measurement relating to said packet flow based on said first transmission performance parameter and said first reception performance parameter, or based on said second transmission performance parameter and said second reception performance parameter, wherein:
  said first connection is originated by a first originating network point and is terminated by a first terminating network point;
  said second connection is originated by a second originating network point and is terminated by a second terminating network point; and
  step a) comprises periodically switching transmission of said packets between said first originating network point and said second originating network point, packets transmitted by said first originating network point and said second originating network point being received at said first terminating network point and said second terminating network point, respectively.

2. The method according to claim 1, wherein step a) further comprises:
  transmitting packets of said packet flow received from said first connection on a further first connection set up through said communication network; and
  transmitting packets of said packet flow received from said second connection on a further second connection set up through said communication network,
  wherein said further first connection is originated by said first terminating network point and is terminated by a further first terminating network point and said further second connection is originated by said second terminating network point and is terminated by a further second terminating network point.

3. The method according to claim 2, wherein:
  step c) further comprises providing a further first reception performance parameter and a further second reception performance parameter relating to said packets as received alternately from said further first connection and said further second connection, respectively; and
  step d) comprises providing a further performance measurement relating to said packet flow based on said first transmission performance parameter or said first reception performance parameter and said further first reception performance parameter, or based on said second transmission performance parameter or said second reception performance parameter and said further second reception performance parameter.

4. The method according to claim 1, wherein step a) comprises transmitting packets of said packet flow by said first originating network point on said first connection during first block periods and transmitting packets of said packet flow by said second originating network point on said second connection during second block periods which alternate in time with said first block periods.

5. The method according to claim 1, wherein said first connection and said second connection are set up on a link between a first node and a second node of said communication network, said first originating network point and said second originating network point being implemented at said first node and said first terminating network point and said second terminating network point being implemented at said second node.

6. The method according to claim 1, wherein said first connection and said second connection are set up within a node of said communication network, said first originating network point, said second originating network point, said first terminating network point and said second terminating network point being implemented at said node.

7. The method according to claim 1, wherein said first originating network point and said second originating network point are physically separated network points, and wherein step a) comprises physically splitting said packet flow between said first originating network point and second originating network point.

8. The method according to claim 1, wherein said first originating network point and second originating network point are logically separated network points, and wherein step a) comprises logically splitting said packet flow between said first originating network point and second originating network point by adding to each packet of said packet flow a connection header comprising a connection identifier, before transmission.

9. The method according to claim 1, wherein said first connection and said second connection are implemented according to a protocol of data link layer, network layer or transport layer.

10. The method according to claim 1, wherein said packet flow is a multipoint packet flow comprising packets having multiple source addresses and/or multiple destination addresses, and wherein:
step b) comprises providing first transmission performance parameters and second transmission performance parameters relating to said packets as transmitted alternately on said first connection and said second connection, respectively;
step c) comprises providing first reception performance parameters and second reception performance parameters relating to said packets as received alternately from said first connection and said second connection, respectively; and
step d) comprises providing a performance measurement relating to packets of said packet flow having a source address of said multiple source addresses and a destination address of said multiple destination addresses based on one of said first transmission performance parameters and one of said first reception performance parameters, or based on one of said second transmission performance parameters and one of said second reception performance parameters.

11. The method according to claim 1, wherein step a) comprises:
upon reception of each packet of said packet flow, checking whether at least one field in the header of said received packet fulfils a balancing condition;
during first periods, transmitting packets of said packet flow which fulfil said balancing condition by said first originating network point and transmitting packets of said packet flow which do not fulfil said balancing condition by said second originating network point; and
during second periods which alternate in time with said first periods, transmitting packets of said packet flow which do not fulfil said balancing condition by said first originating network point and transmitting packets of said packet flow which fulfil said balancing condition by said second originating network point.

12. The method according to claim 11, wherein:
step b) comprises providing said first transmission performance parameter and said second transmission performance parameter relating only to packets which fulfil said balancing condition as transmitted alternately on said first connection and said second connection, respectively, and providing another first transmission performance parameter and another second transmission performance parameter relating only to packets which do not fulfil said balancing condition as transmitted alternately on said first connection and said second connection, respectively, step c) comprises providing said first reception performance parameter and said second reception performance parameter relating only to said packets which fulfil said balancing condition as received alternately from said first connection and said second connection, respectively, and providing another first reception performance parameter and another second reception performance parameter relating only to said packets which do not fulfil said balancing condition as received alternately from said first connection and said second connection, respectively; and
step d) comprises providing said performance measurement relating to said packet flow based on said first transmission performance parameter merged with said another first transmission performance parameter and on said first reception performance parameter merged with said another first reception performance parameter, or based on said second transmission performance parameter merged with said another second transmission performance parameter and on said second reception performance parameter merged with said another second reception performance parameter.

13. The method according to claim 1, wherein:
at step b) said first transmission performance parameter and said second transmission performance parameter comprise a first transmission counter counting packets transmitted by said first originating network point and a second transmission counter counting packets transmitted by said second originating network point, respectively;
at step c) said first reception performance parameter and said second reception performance parameter comprise a first reception counter counting packets received by said first terminating network point and a second reception counter counting packets received by said second terminating network point, respectively; and
step d) comprises calculating a packet loss affecting said packet flow based on said first transmission counter and said first reception counter, or based on said second transmission counter and said second reception counter.

14. The method according to claim 1, wherein:
at step b) said first transmission performance parameter and said second transmission performance parameter comprise a first transmission timestamp relating to at least one packet transmitted by said first originating network point and a second transmission timestamp relating to at least one packet transmitted by said second originating network point, respectively;
at step c) said first reception performance parameter and said second reception performance parameter comprise a first reception timestamp relating to at least one packet received by said first terminating network point and a second reception timestamp relating to at least one packet received by said second terminating network point, respectively;
step d) comprises providing a time measurement based on said first transmission timestamp and said first reception timestamp, or based on said second transmission timestamp and said second reception timestamp.

15. A communication network configured to:
a) alternately transmit packets of a packet flow on a first connection and second connection set up through said communication network;
b) provide a first transmission performance parameter and a second transmission performance parameter relating to said packets as transmitted alternately on said first connection and said second connection, respectively;

c) provide a first reception performance parameter and a second reception performance parameter relating to said packets as received alternately from said first connection and said second connection, respectively; and d) provide a performance measurement relating to said packet flow based on said first transmission performance parameter and said first reception performance parameter, or based on said second transmission performance parameter and said second reception performance parameter, wherein:

said first connection is originated by a first originating network point and is terminated by a first terminating network point;

said second connection is originated by a second originating network point and is terminated by a second terminating network point; and said communication network is configured to periodically switch transmission of said packets between said first originating network point and said second originating network point, packets transmitted by said first originating network point and said second originating network point being received at said first terminating network point and said second terminating network point, respectively.

16. The method according to claim 1, wherein at least a first set of packets in the packet flow include a first destination address and at least a second set of packets in the packet flow include a second destination address different from the first destination address; and the performance measurement includes at least a first performance measurement for the first destination address and at least a second performance measurement for the second destination address.

17. The method according to claim 1, wherein the first originating network point differs from the second originating network point, and the first terminating network point differs from the second terminating network points.

* * * * *